US010803468B2

(12) United States Patent
Grannan et al.

(10) Patent No.: US 10,803,468 B2
(45) Date of Patent: *Oct. 13, 2020

(54) METHOD AND APPARATUS FOR SELECTING ADVERTISING

(75) Inventors: Michael F. Grannan, Parker, TX (US); Lalitha B. Suryanarayana, San Diego, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2364 days.

This patent is subject to a terminal disclaimer.

(21) Appl. No.: 11/405,969

(22) Filed: Apr. 18, 2006

(65) Prior Publication Data

US 2007/0244750 A1 Oct. 18, 2007

(51) Int. Cl.
*G06Q 30/02* (2012.01)
*H04W 4/21* (2018.01)

(52) U.S. Cl.
CPC ......... *G06Q 30/02* (2013.01); *G06Q 30/0258* (2013.01); *G06Q 30/0267* (2013.01); *G06Q 30/0277* (2013.01); *H04W 4/21* (2018.02)

(58) Field of Classification Search
CPC ................................................. G06Q 30/0207
USPC ................................................. 705/14, 14.11
See application file for complete search history.

(56) References Cited

U.S. PATENT DOCUMENTS

| | | | |
|---|---|---|---|
| 6,298,348 B1 * | 10/2001 | Eldering | G06Q 30/02 705/36 R |
| 6,317,718 B1 | 11/2001 | Fano | |
| 6,381,465 B1 * | 4/2002 | Chern et al. | 455/466 |
| 6,519,571 B1 * | 2/2003 | Guheen | G06Q 30/02 705/14.66 |
| 6,647,269 B2 * | 11/2003 | Hendrey et al. | 455/456.3 |
| 6,804,659 B1 * | 10/2004 | Graham | G06Q 30/02 705/14.49 |
| 6,993,326 B2 | 1/2006 | Link, II et al. | |

(Continued)

OTHER PUBLICATIONS

Conventional natural language processing in the NWO priority programme on language and speech technology. Oct. 1996 Deliverables G van Noord, G Bouma, R Koeling, MJ Nederhof—1996.*

(Continued)

*Primary Examiner* — Breffni Baggot
(74) *Attorney, Agent, or Firm* — Guntin & Gust, PLC; Matthew Tropper

(57) ABSTRACT

In one embodiment, a method for selecting targeted advertising, is disclosed including monitoring subscriber event data from a first and a second access subscriber device, calculating a product interest correlation score in a plurality of product categories for the subscriber based on the subscriber event data, reviewing an advertiser database to select an advertisement in the product categories, and selecting a format to deliver the selected advertisement to a third subscriber access device. In another embodiment, a system is disclosed for selecting an advertisement to send to a subscriber, including an internet profiling module that monitors subscriber event data, an internet profiling database for storing and classifying the event data monitored by the internet profiling module, an advertiser index database for storing advertiser detail information, and an intelligent correlation scoring system (ICSS) processor coupled to the internet profiling database, user profile and the advertiser index database.

20 Claims, 10 Drawing Sheets

(56) References Cited

U.S. PATENT DOCUMENTS

| | | | |
|---|---|---|---|
| 7,370,004 B1* | 5/2008 | Patel et al. ................. 705/14.37 |
| 7,370,073 B2* | 5/2008 | Yen et al. ..................... 709/203 |
| 7,596,602 B2* | 9/2009 | Ellman ............. G06Q 30/0601 |
| | | | 455/41.2 |
| 7,664,516 B2* | 2/2010 | Levi ....................... G06Q 30/02 |
| | | | 455/466 |
| 8,566,102 B1* | 10/2013 | Bangalore ............... G10L 15/22 |
| | | | 704/270.1 |
| 8,868,522 B1* | 10/2014 | Zennaro ................. G06F 16/29 |
| | | | 707/694 |
| 2002/0002525 A1* | 1/2002 | Arai ................... G06Q 30/0275 |
| | | | 705/37 |
| 2002/0035501 A1* | 3/2002 | Handel ................. G06Q 30/02 |
| | | | 705/7.32 |
| 2003/0220835 A1* | 11/2003 | Barnes, Jr. ...................... 705/14 |
| 2004/0110517 A1* | 6/2004 | Ellman .................. H04L 67/02 |
| | | | 455/466 |
| 2004/0172336 A1* | 9/2004 | Forsell ................... G06Q 30/02 |
| | | | 705/26.1 |
| 2005/0049886 A1* | 3/2005 | Grannan ................ G06Q 30/06 |
| | | | 705/58 |
| 2005/0060532 A1* | 3/2005 | Dorenbosch et al. ........ 713/100 |
| 2006/0026067 A1 | 2/2006 | Nicholas |
| 2007/0208619 A1* | 9/2007 | Branam et al. ................. 705/14 |
| 2007/0214470 A1* | 9/2007 | Glasgow .......... H04N 21/25866 |
| | | | 725/10 |
| 2007/0239522 A1* | 10/2007 | Kunz et al. ..................... 705/14 |
| 2008/0201731 A1* | 8/2008 | Howcroft ....................... 725/13 |
| 2008/0248815 A1* | 10/2008 | Busch .................... H04L 67/18 |
| | | | 455/456.5 |

OTHER PUBLICATIONS

Wiley Encyclopedia of Computer Science and Engineering (Year: 2009).*

The Internet Encyclopedia (Year: 2003).*

University of Chicago Press, "Why Store Brand Penetration Varies by Retailer" By Sanjay Dhar & Stephen Hoch, Selected Paper 78, April (Year: 1997).*

Kazienko, P.; Multi-Agent System for Web Advertising; Lecture Notes in Computer Science; 2005; p. 507-513; Springer-Verlag, Germany.

Wales et al.; IPTV—The Revolution Is Here; Dec. 7, 2005, pp. 1-19.

* cited by examiner

US 10,803,468 B2

METHOD AND APPARATUS FOR SELECTING ADVERTISING

BACKGROUND OF THE DISCLOSURE

Field of the Disclosure

The present disclosure relates generally to providing selected advertising to send to a recipient.

Description of the Related Art

Targeted advertising selects an advertisement and sends the advertisement to selected individuals who are targeted to receive the advertisement. Advertisers can potentially save advertising dollars by selecting who will receive their advertisements rather than indiscriminately broadcasting their advertisements to a general population of recipients. Thus, only those individuals selected by an advertiser receive the targeted advertisement in hope that the targeted recipients will be more responsive on a per capita basis than a general broadcast population. Advertisement distributors and providers that enable such an advertising model (e.g. Internet portals, television providers, access network providers) can correspondingly increase their revenue per advertisement impression by providing targeted advertising options for advertisers.

Targeted advertisements have historically been sent to targeted recipients based on geographic areas so that regional advertisers reach only those advertising recipients who are deemed by the advertiser as most likely to be responsive to their advertisements. Targeted advertisements have also been directed to selected demographic sectors of the population so that the targeted advertisement is sent only to those members of a selected demographic sector who are deemed by advertisers to be most likely to be responsive to their advertisements.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

DETAILED DESCRIPTION OF AN ILLUSTRATIVE EMBODIMENT

Figure 1:
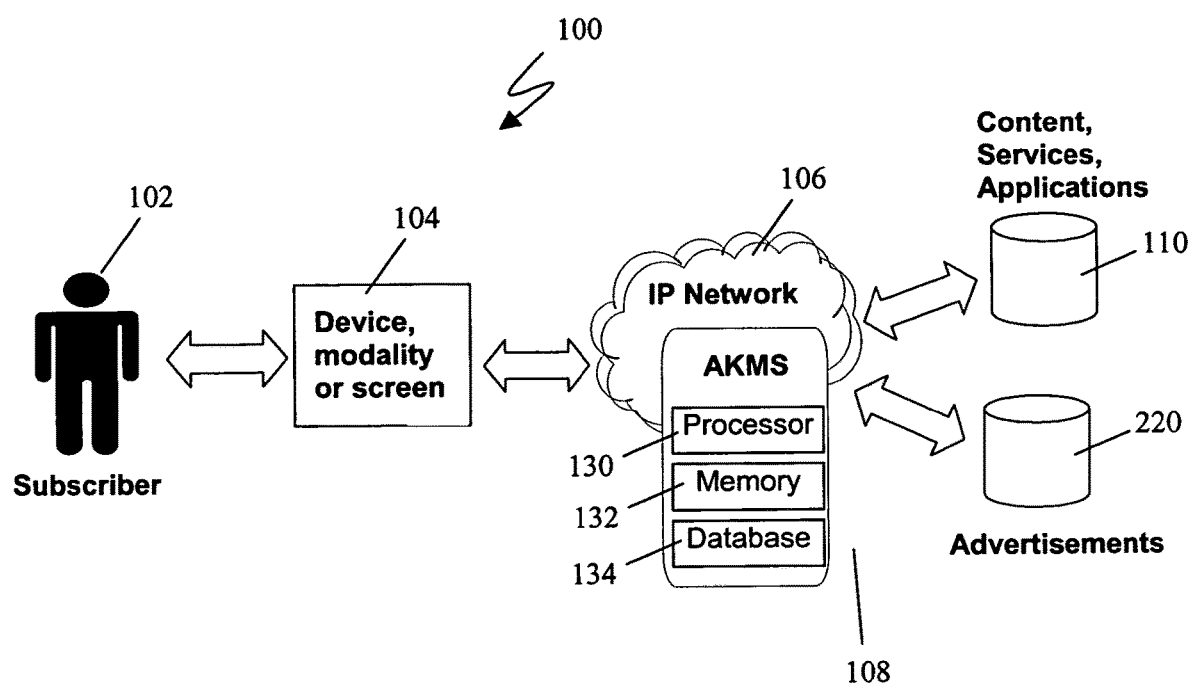
FIG. 1 is a high level block diagram depicting an illustrative embodiment of a system and method for selecting targeted advertising showing an Advertising Knowledge Management System (AKMS) acting as an intermediary between a subscriber with various access devices, advertisers and content and service providers.

In view of the above, an illustrative embodiment is presented through one or more of its various aspects to provide one or more advantages, such as those noted below.

Given the privacy concerns of subscribers, an illustrative embodiment of a system and method provides subscriber directed privacy controls that include utilizing subscriber usage information as opt in settings defined by the subscriber, and maintained in the user's profile. The subscriber privacy controls are further supplemented with merchant and service provider privacy controls that may be used to restrict access to monitoring subscriber related data including but not limited to subscriber identity and subscriber activity such as phone logs and web surfing history. In another embodiment the subscriber has strict control over how his personal web surfing, communications, and purchase information can be used in identifiable and non-identifiable ways (i.e., relate data collected anonymously or to a specific user), both in maintaining the product interest correlation system, and in determining what can be acceptably advertised to the subscriber.

In an IP based targeted advertising system, the subscriber has full control over which of her tasks are tracked and how they are tracked (e.g., by identifying the user, generically flagging the data, for the purposes of maintaining product correlation interests, as well as what types of ads can be delivered and under what circumstances the subscriber is willing to receive them. Regardless, none of the subscriber's personal usage information needs to be disclosed to potential advertisers. Rather, advertisers can use only the product interest correlation scores, subscriber permissions defining under what circumstances they are willing to receive an advertisement, and the current context of the user (all with subscriber opt in) to determine whether delivering an advertisement to the subscriber at an agreed upon time and price is appropriate.

In a particular embodiment a method is disclosed for selecting advertising. The method includes monitoring subscriber event data from a first subscriber access device and a second subscriber access device, calculating product interest correlation scores in a plurality of product categories for the subscriber based on the subscriber event data, reviewing an advertiser database to select an advertisement in at least one of the product categories, and selecting a format to deliver the selected advertisement to a third subscriber access device.

In another particular embodiment of the method the subscriber event data is at least two of selecting a television station, selecting a interactive television menu option, selecting content for an internet protocol (IP) access device, accessing a resource indicated by a uniform resource indicator (URI), browsing a web site, creating a user profile, carrying out a digital purchase transaction, internet chatting, internet blogging, placing a telephone call, sending an instant message, receiving an instant message, receiving an email and sending an electronic mail message.

In another particular embodiment of the method the first subscriber access device is selected from a group including but not limited to a cell phone, personal digital assistant (PDA), lap top computer, stationary personal computer, IPTV remote control, web tablet, laptop computer, pocket PC, a television set capable of receiving IP based video services and mobile IP device, the second subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, and the third subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device.

In another particular embodiment of the method, the first, second and third subscriber access devices are different from each other.

In another particular embodiment the method further includes determining a characteristic for the third subscriber access device and adapting an advertisement format for the third subscriber access device to at least one of the group consisting of audio, video, graphics support, and text fidelity to match the characteristic of the third access device.

In another particular embodiment the method further includes weighting the product interest correlation scores based on previous event data for the subscriber in the product categories. In another particular embodiment of the method selecting a format further includes assessing real time contextual information about the subscriber and weighting the product interest correlation score based on the real time contextual information.

In another particular embodiment the method further includes accepting a subscriber input for allowing for at least one of the group consisting of accepting advertising on an access device and monitoring of subscriber event data. In another particular embodiment the method further includes assessing event data to infer subscriber intent in the product categories and weighting the product interest correlation scores based on the subscriber intent in the product categories.

In another particular embodiment the method further includes determining an available advertising window based on a current usage scenario for the subscriber, correlating product categories for a plurality of available advertisements in the plurality of product categories to the current usage scenario, and selecting an advertisement from the plurality of available advertisements in one or more the plurality product categories based on a high auction bid.

In another particular embodiment the method further includes receiving a plurality of advertisers' auction bids in the plurality of product categories based on the correlation score and selecting an advertisement in one of the product categories with a highest bid from the plurality of advertisers. In another particular embodiment of the method the advertisers' auction bids are for two or more product categories.

In another embodiment a system is disclosed to select advertising is disclosed. The system includes a processor in communication with a memory, an advertising index database in the memory, a product interest correlation scores data structure in the memory, an event data interface that receives event data from at least a first and a second subscriber access device to store and classify the event data in the memory, and a computer program for execution by the processor that contains instructions to calculate a plurality of product interest correlation scores for a subscriber in a plurality of product categories based on the event data and instructions to apply the product interest correlation scores to an advertisement database to select an advertisement in the product category to send to the subscriber over a third subscriber access device.

In another particular embodiment of the system the first subscriber access device is selected from a group consisting of a cell phone, personal digital assistant (PDA), lap top computer, stationary personal computer, IPTV remote control, web tablet, laptop computer, pocket PC, a television set capable of receiving IP based video services and mobile IP device, the second subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, and the third subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device.

In another particular embodiment of the system the first, second and third subscriber access devices are different from each other.

In another particular embodiment of the system the event data interface receives data indicating at least one of the group consisting of selecting a television station, selecting a interactive television menu option, selecting content for an internet protocol (IP) access device, accessing a resource indicated by a uniform resource indicator (URI), browsing a web site, creating a user profile, carrying out a digital purchase transaction, internet chatting, internet blogging, placing a telephone call, sending an instant message, receiving an instant message, receiving an email, and sending an electronic mail message.

In another particular embodiment the system further includes an advertiser interface for receiving advertisers' auction bids for the product category based on the correlation score. In another particular embodiment the system further includes an interface for sending the selected advertisement to a subscriber access device.

In another particular embodiment a data structure is disclosed. The data structure includes a plurality of correlation scores fields for storing correlation scores data indicating a correlation score in a plurality of product categories for a subscriber, a product categories field for storing product categories data indicating a plurality product categories, a plurality of subscriber identifier fields for storing subscriber identifier data indicating identifiers for the subscriber, and a plurality of subscriber event data fields for storing subscriber event data from at least a first access device and a second access device for use in calculating the plurality of correlation scores in the plurality of product categories.

In another particular embodiment of the data structure the subscriber event data is selected from a group consisting of selecting a television station, selecting a interactive television menu option, selecting content for an internet protocol (IP) access device, accessing a resource indicated by a uniform resource indicator (URI), browsing a web site, creating a user profile, carrying out a digital purchase transaction, internet chatting, internet blogging, placing a telephone call, sending an instant message, receiving an instant message, receiving an email and sending an electronic mail message.

In another particular embodiment the data structure further includes a plurality of advertisement fields for storing data for an advertisements for sending to a third subscriber access device. In another particular embodiment the data structure further includes a retail store layout field for storing data indicating a merchant physical location layout for locating in a merchant physical location a product in the product category of the advertisement sent to the third subscriber access device.

In another particular embodiment the data structure further includes a product inventory field for storing data indicating a product inventory for a merchant physical location having the product in the product category of the advertisement sent to the third subscriber access device. In another particular embodiment the data structure further includes a threshold field for storing data indicating a product interest correlation score threshold for determining whether to send an advertisement to a subscriber access device.

In another particular embodiment a device for receiving an advertisement targeted to a subscriber is disclosed. The device includes a subscriber access device for accessing an internet protocol (IP) network and an interface on the access device for receiving a targeted advertisement based on a product interest correlation score for the subscriber wherein the product interest correlation score is event data from a first and a second access subscriber device, calculating a product interest correlation score in a plurality of product categories for the subscriber based on the subscriber event data, reviewing an advertiser database to select an advertisement in at least one of the product categories, and selecting a format to deliver the selected advertisement to a third subscriber access device.

In another particular embodiment of the device the subscriber event data is at least two selected from the group consisting of selecting a television station, selecting a interactive television menu option, selecting content for an IP access device, accessing a resource indicated by a uniform resource indicator (URI), browsing a web site, creating a user profile, carrying out a digital purchase transaction, internet chatting, internet blogging, placing a telephone call, sending an instant message, receiving an instant message, receiving an email, and sending an electronic mail message.

In another particular embodiment of the device the first subscriber access device is selected from a group consisting of a cell phone, personal digital assistant (PDA), lap top computer, stationary personal computer, IPTV remote control, web tablet, laptop computer, pocket PC, a television set capable of receiving IP based video services and mobile IP device, the second subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, and the third subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device.

In a particular embodiment a computer readable medium having a computer program for selecting advertising embedded therein is disclosed. The computer program includes instructions to monitor subscriber event data from a first subscriber access device and a second subscriber access device, instructions to calculate a product interest correlation score in a plurality of product categories for the subscriber based on the subscriber event data, instructions to review an advertiser database to select an advertisement having a highest correlation score in the product categories, and instructions to select a format to deliver the selected advertisement to a third subscriber access device.

In another particular embodiment of the medium the subscriber event data includes at least two selected from the group consisting of selecting a television station, selecting a interactive television menu option, selecting content for an internet protocol (IP) access device, browsing a web site, carrying out a digital purchase transaction, internet chatting, internet blogging, placing a telephone call, sending an instant message, receiving an instant message, receiving an email, and sending an electronic mail message.

In another particular embodiment of the medium the first subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, the second subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, and the third subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device.

In another particular embodiment a system for selecting an advertisement to send to a subscriber is disclosed. The system includes an internet profiling module that monitors subscriber event data from at least a first and a second subscriber access device, an internet profiling database for storing and classifying the event data monitored by the internet profiling module, an advertiser index database for storing advertisers' detail information, and an intelligent correlation scoring system (ICSS) processor coupled to the internet profiling database, user profile and the advertiser index database, wherein the ICSS processor is configured to determine product interest correlation scores in a plurality of product categories and select advertisements indicated in the advertiser index database based on product interest correlation scores for the subscriber in the plurality of product categories based on event data from a first and second access device, wherein the advertisement is sent to a third subscriber access device.

In another particular embodiment the system further includes a URI tracking system that assesses subscriber event data from at least a first subscriber access device and a second subscriber access device in real time for subscriber intent in a plurality of product categories.

In another particular embodiment of the system wherein the URI tracking system is at least one selected from the group consisting of a web spidering system, a simple object access protocol (SOAP) proxy, a caching proxy, a transcoding proxy (content translation, media conversion, etc.), a session initiation protocol (SIP) proxy for multimedia sessions, an open mobile alliance (OMA) Push proxy, wireless applications protocol (WAP) proxy and a proxy acting as a firewall, network/application filter.

In another particular embodiment the system further includes a data structure containing user profile settings to opt in to being monitored by the internet profiling module.

In another particular embodiment a method for selecting targeted advertising in an internet protocol television system IPTV is disclosed. The method includes monitoring in an IPTV server subscriber event data from a first subscriber access device and a second subscriber access device, calculating in the IPTV server a product interest correlation score in a plurality of product categories for the subscriber based on the subscriber event data, reviewing in the IPTV server an advertiser database to select an advertisement in at least one of the product categories, and selecting in the IPTV server a format to deliver the selected advertisement to a third subscriber access device.

In another particular embodiment of the method the subscriber event data is at least two selected from the group consisting of selecting a television station, selecting a interactive television menu option, selecting content for an internet protocol (IP) access device, browsing a web site, carrying out a digital purchase transaction, internet chatting, internet blogging, placing a telephone call, sending an instant message, receiving an instant message, receiving an email, and sending an electronic mail message.

In another particular embodiment of the method the first subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, the second subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device, and the third subscriber access device is one selected from a group consisting of a cell phone, personal digital assistant (PDA), lap top computer, stationary personal computer, IPTV remote control, web tablet, laptop computer, pocket PC, a television set capable of receiving IP based video services and mobile IP device.

In a particular embodiment an internet protocol television (IPTV) system for selecting an advertisement to send to a subscriber is disclosed. The system includes an internet profiling module associated with an IPTV server that monitors subscriber event data from at least a first and a second subscriber access device, an internet profiling database associated with the IPTV server for storing and classifying the event data monitored by the internet profiling module, an advertiser index database associated with the IPTV server for storing advertisers' detail information, and an intelligent correlation scoring system (ICSS) processor associated with the IPTV server coupled to the internet profiling database, user profile and the advertiser index database, wherein the ICSS processor is configured to determine product interest correlation scores in a plurality of product categories and select advertisements indicated in the product categories based on event data from a first and second access device, wherein the advertisement is sent to a third subscriber access device.

In another particular embodiment the system further includes a URI tracking system that assesses subscriber event data from at least a first subscriber access device and a second subscriber access device in real time for subscriber intent in the plurality of product categories.

In another particular embodiment of the system the URI tracking is one selected from the group consisting of a web spidering system, a simple object access protocol (SOAP) proxy, a caching proxy, a transcoding proxy (content translation, media conversion, etc.), a session initiation protocol (SIP) proxy for multimedia sessions, an OMA Push proxy, wireless applications protocol (WAP) proxy and a proxy acting as a firewall, network/application filter.

Another illustrative embodiment discloses a system and associated methods to provide a more robust ability to target advertising to consumers across all access devices and mediums and associated services that run over them. The illustrative embodiment monitors the access devices and sends targeted advertisements to the access devices of subscribers.

Consumers are now provided increasingly more choices in high speed internet protocol Internet access networks. Moreover, consumption of television services and Internet content will be increasing over new delivery systems such as IPTV platforms, digital subscriber line (DSL), fiber optic, and cable broadband networks, municipal wireless networks, and third generation (3G) mobile networks. Subscriber access devices used to access these networks can be used to deliver targeted advertising to subscribers. In an illustrative embodiment an advertising knowledge management system (AKMS) provides targeted advertisements to subscribers using modalities including but not limited to TV commercials, banner advertisements in web browsers, multimedia IP based advertisements via web browser plug-ins such as flash, instant messaging, multimedia messaging service (MMS) and short messaging service (SMS) messages sent to a cellular telephones. The AKMS also provides pricing, modality and scheduling options to advertisers. Using MMS or flash the AKMS can send pictures, movie clips, cartoons and other graphic materials to cell phones. Using SMS the AKMS can send and receive short alphanumeric messages to and from mobile telephones. The AKMS can also send video, audio, emails and text data over any communication network to which it has access including but not limited to an IPTV network, public switched telephone network (PSTN), VoIP network, wireless network, Wifi and/or WiMAX network which now exists or may be created in the future that can be used to send data to a subscriber access device.

For example, an illustrative embodiment provides targeted advertisements and pricing options as described in the following illustrative scenarios. Susan is planning to purchase children's books as a Christmas present for her nephews. She goes online to a retailer's web site and browses through a number of titles but decides to hold off on a purchase. Presuming Susan has exercised an opt-in preference that allows the AKMS system to monitor her URI and her Internet surfing behavior as a subscriber for this Internet session, this URI visitation information regarding the retailer's web site is mined and stored. After the Internet session and visiting the URI, the illustrative system and method performs spidering and categorization of the web pages visited by Susan to determine her intent for the URI visit and correlates this intent to an interest in certain product categories. A product interest correlation score is calculated for her based on this interest the product category.

Later when Susan is walking through the local mall to finish her other shopping, she receives a targeted text advertisement on her cell phone from the AKMS for the local book store indicating a discount sale on children's books. Hopefully, based on her response to the targeted advertisement to her cell phone, Susan impulsively walks into the store and makes a purchase. A participating merchant may report her purchase to a digital purchase history in the AKMS (or it may be obtained from the eWallet transaction from the service provider). The AKMS will reflect this in her product interest correlation score in this product category. The targeted advertisement Susan received on her cell phone was based on her historic surfing/shopping behavior combined with Susan's presence in a certain location that is close to a merchant selling products in which she is interested determined by her surfing/shopping behavior. Moreover, the purchase of the product and recording of that purchase transaction within the AKMS now reduces or blocks her product interest correlation score for that book—but it likely increases Susan's product interest correlation score for additional products related to the same book. The AKMS is able to interpret such new product interests in order to provide future targeted advertising opportunities to Susan for related products in related product categories.

In another exemplary scenario, during the summer, Anna and her sister have watched a children's television show on a particular television channel every afternoon. It is their favorite show. This is reflected in the product interest correlation scores for Anna and her sister and their mom is selected to receive an advertisement in a product category related to the show. When summer ends, as their mom goes shopping for school supplies, she receives a targeted video advertisement on her WiFi enabled Personal Digital Assistant (PDA) or data capable cellular telephone indicating the availability of the children's television show signature back packs and lunch boxes, providing her with directions on how to get to "aisle 12" in the store (physical merchant location) where the product is located. Knowing Anna too well, of course, mom will strongly consider purchasing school supplies portraying one of Anna's favorite TV characters. Most kids who watch the children's television show also own or rent a related digital video disk (DVD). Thus Anna's product interest correlation score is increased for the DVD, as a DVD product category. An advertisement in the DVD product category is selected to send to Anna's mom. As Anna's mom is driving past a DVD rental store on her way home (or is watching a late night show), she receives a similar advertisement to her portable device for related DVD to be rented or downloaded to the home. In order to trigger an advertisement from another nearby store Mom may send a search request from her cell phone to the Internet for the DVD or for another product category. Based on her location and the product category, her product interest correlation score in that product category searched will increase and an advertisement may be selected to send to Anna's mom.

In another exemplary scenario, while doing his homework, Sean, a high school student has tuned in to a hip hop Internet radio channel from his laptop computer. Sean's product interest correlation score is thus increased in this product category, "rap music". Later on in the evening, when he turns on his cell phone to chat with a friend, he receives a targeted text message advertisement for a ring tone of a rap artist's latest track. Always known to walk around with the latest ring tone on his cell phone, Sean has opted in to receive advertisements regarding ring tones for his mobile device. Now he only has to push a few buttons in order to purchase this ring tone content via his eWallet and download the ring tone to his mobile device without having to search for the ring tone on the Internet. Thus, Sean saves time and effort and the advertisers' targeted advertising effort has been successful. (eWallet, also referred to as digital wallet, is an application or service that assists consumers in conducting online transactions by allowing them to store billing, shipping, payment, and preference information and to use this information to automatically complete merchant forms. This greatly simplifies the check-out process and minimizes the need for a consumer to think about and complete a merchant's form every time. eWallets that fill forms have been successfully built into browsers, as proxy servers, as helper applications to browsers, as stand-alone applications, as browser plug-ins (including for example, an Internet search engine toolbar), and as server-based applications. The most likely future eWallet for consumers will be built-in right into their web-enabled cellular telephone.)

An illustrative embodiment provides an improved system and method for mining subscriber information from many sources and subscriber access devices (e.g. Internet surfing, content consumption, proactively subscriber stated product interests, purchase history, and telephone call logs) and across many subscriber access devices to create a more compelling targeted advertising experience for advertisers and subscribers. The AKMS in an illustrative embodiment can also insert advertisements into web browsers based on not only the actual search conducted by the subscriber, but also taking into account the current usage scenario, location and other contextual information about the subscriber. The AKMS can send advertising to television advertising platforms for on-demand cable systems to provide geographic targeting and one-to-one targeting potential to set top boxes (STBs).

Turning now to FIG. 1, FIG. 1 is a high level block diagram of an illustrative embodiment that depicts the role the illustrative embodiment AKMS plays in acting as an intermediary between the subscriber 102 and a host of providers including advertisers, content companies and application service providers. The subscriber communicates with the AKMS 108 using a subscriber access device 104 which may include but is not limited to a cell phone, personal computer, PDA, computer mouse, or IPTV receiver and input device, such as a remote control. The AKMS includes a processor 130 coupled to memory 132 and database 134 in memory. A computer readable medium containing instructions that can be executed by the processor is embedded in the memory. In an illustrative embodiment the AKMS 108 monitors and compiles a subscriber's event data including but not limited to current session and the device characteristics of the access device 104 being used to access IP-based services over an IP network 106, along with previous usage history to assist service providers and advertisers in evaluating the potential appeal of their services and advertisements to the particular subscriber. The subscriber may use any access device to interact with the IP network 106 to access content, services and applications 110. The IP network may include but is not limited to a combination of an IPTV network, VoIP network, cellular telephone network, WiMax, WiFi and may access a public switched telephone network (PSTN).

In an illustrative embodiment the AKMS accesses the advertisements database 220 to select a targeted advertisement to send to the subscriber. The AKMS 108 automatically calculates a product interest correlation score and recommends and/or selects an advertisement, access device and advertisement modality to be used to send a selected advertisement to a selected subscriber access device based on the subscriber's current usage scenario. A subscriber usage scenario includes but is not limited to a subscriber's current access device, location and activity (e.g., watching a particular show over an IPTV network, web surfing, gaming, talking on a phone, chatting on the internet, etc.). For example, if a subscriber has a product interest correlation score higher than a product interest correlation score threshold set by an advertiser for a product category, the illustrative embodiment AKMS system and method can select and send an advertisement in the product category formatted suitably for reception on the subscriber's cell phone (access device) as the subscriber drives near one of the advertiser's merchant physical locations. The subscriber's location can be tracked by global positioning system (GPS), cell tower proximity or triangulation or WiFi hot spot proximity based on the user's cell phone, laptop computer or other access device and factored into the bid price by the advertiser. Alternatively, the user's current location, activity, and correlation scores for product categories may be used to select and queue up an advertisement for delivery later through a different access device. For example, a merchant who is in the vicinity of a subscriber's recent location may choose to send a 30-second television commercial, which cannot be accommodated on the subscriber's current portable access device. The commercial can be queued for delivery once the subscriber is at home watching television rather than immediately sending an advertisement to the subscriber's cell phone.

For example, in an illustrative embodiment a product interest correlation score may range from 1 to 100. An advertiser may set a product interest correlation score threshold of 20 for sending a text advertisement to a subscriber's cell phone, a product interest correlation score threshold of 50 for sending a video advertisement to the subscriber's cell phone and set a product interest correlation score threshold of 90 for sending a video advertisement to the subscriber's IPTV receiver.

Figure 2:
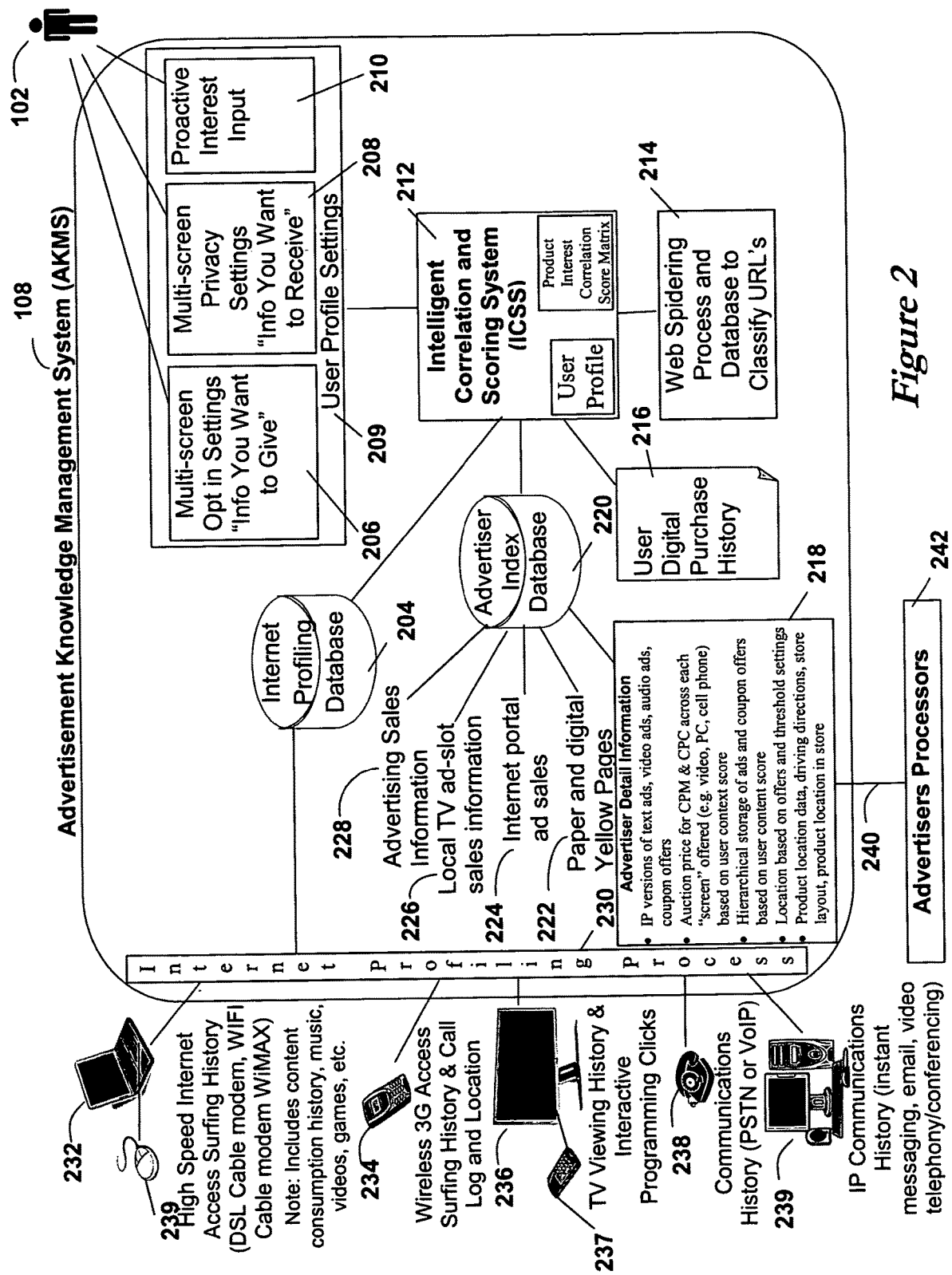
FIG. 2 is a block diagram of system components in an illustrative embodiment of a system for determining which advertisements should be targeted to a subscriber, according to teachings of the present disclosure.

Turning now to FIG. 2, FIG. 2 is a block diagram 200 depicting informational components that are used by and integrated into the AKMS 108 in an illustrative embodiment system and method. In an illustrative embodiment, the AKMS system and method 108 aggregates, collates and mines surfing and content (music, television, movies, audio books, etc.) consumption data across multiple access devices and network access devices and mechanisms (e.g., including but not limited to, IPTV, wireless 3G, high speed Internet access), coordinating the information tightly with subscriber opt-in preferences, to create a highly targeted and contextualized advertising system for subscribers of IP-based services (including but not limited to, IPTV, VoIP, email, SMS, mobile calling, web surfing, instant messaging (IM), chatting, blogging, and mobile computing, etc.).

As shown in FIG. 2, an Internet profiling process 230 monitors a subscribers' access devices event data used to access the IP network and stores the access event devices data in an Internet profiling database 204. The access devices include but are not limited to telephones 238 calling via a public switched telephone network (PSTN) or connected over a VoIP network, remote controls for television viewing selections and interactive programming clicks or menu selections 236, cell phones 234 using 3G access for accessing the Internet and calling and personal computers/lap top computers and other IP devices 232 using high speed Internet access for web browsing, SMS, IM, email, chatting, text messaging, etc. Location information 235 obtained during the subscribers' use of mobile and/or portable Internet devices is also provided to the Internet profiling process 230. Given that a subscriber has "opted in" to allow being monitored for some or all of the information available through the Internet profiling process 230, the Internet profiling process 230 monitors the access devices event data associated for the subscriber's communications including outgoing calls, telephone numbers called, Internet access surfing history, content consumption, music, videos and games, IM, text messaging, chatting, and locations of a subscriber, etc. The Internet profiling process may monitor digital or analog electronic activity of the subscriber to store in the subscriber profile 209 and calculate a product interest correlation score in a product or service category for the subscriber based on the monitored event data.

An advertiser index database 220 stores data indicating advertising sales information 228, local television ad-slot sales information 226, Internet portal advertising sales 224, paper and digital yellow pages sales and advertiser detail information 218. The ad-slot sales information may include times in which available advertising spots are available and in what medium, for example IPTV, IP radio, etc. The advertiser detail information 218 includes but is not limited to IP versions of text advertisements data, video advertisements, audio advertisements and coupon offers. The advertising detail information data further includes but is not limited to auction prices for cost per thousand (CPM), cost per hundred (CPC), and cost per one (CPO) data for each access device display or "screen" offered for advertising, e.g., video, personal computer, and cell phone screens based on time slot and subscriber product interest correlation score data in a designated product data category. The advertising detail information further includes but is not limited to hierarchical storage of advertisements and coupon offers based on subscriber product interest correlation score data and subscriber context score data in a product category. Audio advertisements can be sent to subscriber cell phones or mobile IP devices as recorded messages and video, audio, text and email advertisements can be sent to subscriber cell phones, PDAs, lap top computers and other mobile digital devices capable of receiving data.

The advertising detail information data further includes but is not limited to location based advertisements data and a product interest correlation score threshold data settings. The location data may include but is not limited to a distance from an advertiser location within which a subscriber will be sent an advertisement for the location. The advertising detail information data further includes but is not limited to product location data, driving directions data to the nearest merchant physical location (or store) having the product in stock, product inventory data for that location and layout data for the merchant physical location having the product in stock and location data within the merchant physical location layout at which the product is located indicating where to find the product in the merchant physical location (e.g., "aisle 12").

Targeted advertisement data can be sent to a subscriber access device, e.g., cell phone, PC or IPTV receiver. The advertisement can include a menu button for selection by an access device to see if a product is in stock and where the product is located in a store having a product in stock. The location of the product in the store can be based on the product uniform product code (UPC) data and digital store inventory data provided by the advertiser. Coupons for the product can be sent along with the advertisement which can be displayed at the store or can be represented by a coupon code sent to the access device that can be presented at the time of purchase to validate the coupon and receive a discounted price or other offer associated with the coupon and advertisement. The subscriber may also have the option of completing the purchase digitally using the eWallet, so the item is ready for pick-up at the retail outlet when they arrive. In such an instance the subscriber's user eWallet and digital purchase history 216 in the AKMS would be updated accordingly. The digital purchase history includes eWallet purchases, subscriber purchases reported by merchants or monitored by the Internet profiling process and purchase information imported from another network.

Once a subscriber enters a mall or store an advertiser can send video or hierarchical graphical displays to a subscriber cell phone or other mobile device guiding the subscriber through shopping and locating products at the store or mall. An advertiser may provide a shopper's assistant software agent in which a subscriber may be guided by asking questions (using textual verbal entry through an automatic voice response system powered by the AKMS and advertising processor using data from the advertiser information data) of the software agent to guide the subscriber through a shopping experience in the store or mall. A user may enter additional products via a selection menu presented by an advertisement sent to a subscriber's mobile access device to locate the products in the store or mall.

Advertiser processors 242 may send and receive data to and from and interact with the advertiser detail information data 218 via interface 240. Interface 240 which may be any digital or electrical interface for sending and receiving messages and data between an advertiser processor 242 and the advertiser detail information 218 data storage. The advertiser index database 220 is in communication with the intelligent correlation and scoring system (ICSS) 212. The ICSS also communicates with the Internet profiling database 204, a user digital purchase history 216, and a web spidering process that classifies URIs 214, subscriber intent and user (subscriber) settings. In an illustrative embodiment the web spidering process visits each URI visited by a subscriber and assesses the subscriber's intent in visiting the URI. Web spidering, otherwise known as web crawling, browses the World Wide Web in a recursive, automated manner by starting with a list of URIs to visit, and then checking for hyperlinks at each URI and visiting those also. In an illustrative embodiment, the web spidering process 214 parses the text on each web page visited by a subscriber and infers product category interest intent for a subscriber visiting the web page for one or more product categories.

In an alternative embodiment, instead or in addition to the web spidering system, a web proxy may be introduced between the subscriber access device and a server to monitor and capture, URIs and URI data accessed by any one of the subscriber access devices used by the subscriber. A processor within the proxy or connected to the proxy will use this data to classify and categorize online events. Such URI data may include responses from the URI to the subscriber including but not limited to purchase transactions, content including video, audio and text and messaging interactions. The URIs and URI data is cached, stored and classified/categorized and indexed with meta data added by the spidering system or proxy.

Proxy manifestations include but not limited to a variety of proxy types (stateful or stateless) may be used for this purpose, including but not limited to a traditional web HTTP proxy/intermediary/gateway. The proxy may further function as a, but not limited to the following, simple object access protocol (SOAP) proxy, a caching proxy, a transcoding proxy (content translation, media conversion, etc.), a session initiation protocol (SIP) proxy for multimedia sessions, an OMA Push proxy, wireless applications protocol (WAP) proxy or a proxy acting as a firewall, network/application filter, providing NAT and other security functions such as border control. In an illustrative embodiment the proxy sits in between a client and server and can act as a client as well as server depending on its functions.

The product interest correlation score for such categories is then weighted appropriately for the subscriber to reflect this interest. The user profile setting includes but is not limited to user profile data and user profile settings 206, 208 and 210. User profile data includes but is not limited to ages, family size, ethnicity, language spoken, address, subscriber user identifiers for family members, etc. User profile settings may also include but are not limited to multiple screens or device opt-in settings for selecting access devices through which a subscriber 102 is willing to allow advertising to be received 208. User profile settings may also include privacy (opt-in) settings defining specifically what categories of advertising may be received, and in what format 208. User profiles may also include proactive product interest input 210 provided by a subscriber. The web spidering process described herein is for example only and not intended to limit the scope of the disclosure as a number of different spidering or assessment techniques can be utilized as well as a number of different methods for assessing a subscriber's intent by analyzing and assessing a subscriber's web surfing URIs visited, telephone numbers called, IM and other activities, all of which are included herein under the term "spidering".

Advertisers can place advertisements in multiple media and formats, including text only, audio, HTML, and video that can be rendered to multiple access devices used by the subscriber as appropriate. Several criteria are used to determine advertisement placement or delivery and delivery timing for subscribers. The criteria for determining advertisement placement or selection and delivery to a subscriber can include but are not limited to location data, product interest correlation score data, current usage scenario (e.g., watching an IPTV show, listening to internet radio, playing a game, driving near a product advertiser physical location) and time of day. For example, an advertiser may place an auction bid for a price to send a text message advertisement to cell phones to reach the first 2000 14-18 year old boys between 5 and 9 pm on weekends who are within 5 miles of a shopping mall location having a product interest correlation score for a particular video game exceeding a product interest correlation score threshold of 50.

In another example, an advertiser may want to send an IPTV video advertisement on subscriber IPTV displays for a Karaoke machine during showing of a television show, e.g., American Idol to everyone that is watching American Idol on IPTV (live or in replay) and that called in (or sent a text message) to vote on an American Idol contestant and have a product interest correlation score in a product category greater than a product interest correlation score threshold of 90. Other people watching American Idol who called in to vote and having a product interest correlation score greater than 50 and less than 90 could be sent a text advertisement on their IPTV display for the Karaoke machine.

Product interest correlation scoring aggregates weighting and scoring for web surfing history, behaviors and context across multiple devices including more detailed knowledge of what transactions/interests were actually conveyed by subscriber web surfing and behavior. A web spidering (spidering) system matches subscriber accessed URIs anonymously with a subscriber's inferred intent by way of checking a dynamic database of URIs for specific sites that have been compiled through the web spidering process 214. The illustrative embodiment provides a classification system that schedules and conducts a web spidering procedure, in which procedure, web sites are scanned and specific URIs that have been visited by a subscriber are categorized based on perceived or inferred intent of anyone accessing the URI, by using, e.g., natural language parsing and processing techniques. For example, the spidering system can anonymously ascertain that not only did a subscriber visit a car manufacturer's web site to look at cars; the subscriber actually looked at the product page for a particular model in detail and requested mailing of a product brochure. The subscriber's inferred intent (in this case purchasing a Toyota Camry) derived by the web spidering system increases the subscriber's product interest correlation score for a product category for Toyota Camry.

Auction-based advertising across multiple screens or access devices based on a correlation or comparison of the advertisement product category with the product interest correlation score for the product/service for a particular subscriber allows advertisers to tightly control and select what degree of advertisement contact should be made with a subscriber (e.g., one to one TV advertisement, text message to phone) and what price contacting that subscriber with an advertisement is worth. For example, in an example of contextual information, a person who has already received a video one to one TV advertisement may be sent a lower cost text advertisement as a reminder rather than paying to send another higher price video advertisement to the subscriber. Once an advertisement type has been selected for the selected advertisement type in a given product category for a subscriber or a group of subscribers, auction based advertisements can be based on interactive bids between competing advertisers.

Subscriber-defined product and service interests along with privacy settings enable subscribers to control what information they are willing to have monitored and used by the AKMS 108 for targeting advertisements to them, and what information they are willing to receive (e.g., on which access devices, from which advertiser product interest categories, at what times). Digital purchase history 216 plus brick and mortar purchases bought with electronic wallet (eWallet) credentials help corroborate additional product interest information on behalf of the subscriber by tracking purchase data for the subscriber. Subscriber digital purchase history information keeps track of on-line purchases and purchases at retail outlets when an associated electronic wallet capability is used (eWallet).

Subscriber location is based on wireless networks (WiFi, WiMAX) or the fact the subscriber is located at home using high-speed Internet access assists advertisers in determining how receptive the subscriber might be to their advertisement/product at that time. The more receptive subscriber is given a greater weight in their product interest correlation score.

The illustrative embodiment AKMS 108 aggregates data from multiple sources to provide a centralized storage for Intelligent Correlation and Scoring System (ICSS) regarding determining the appropriate advertisements to target a subscriber at a specific time. The illustrative embodiment AKMS 108 includes the ICSS 212. Inputs to the ICSS 212 include an Internet profiling database 204 which supplies the surfing and content consumption history for the subscriber across multiple access devices; an advertiser index database 220 which maintains substantially all advertising related information including what advertisements have been sold, along with digital versions of various IP-based advertisements; a purchase history 216 for the subscriber that includes purchases made electronically online, plus brick and mortar retail purchases that may be able to be tracked to the subscriber via the subscriber using the electronic wallet (eWallet) that are tied to his subscriber sign-on identity; subscriber profile settings 209 that provide the subscriber the chance to define privacy settings by opt ins or by other privacy control settings on their internet browser, for example, with regard to what types of advertisements the subscriber wants to receive, plus how much of the subscriber's usage history can be monitored and used to drive the targeted advertising process; and a web spidering process 212 that provides more definitive information on what specific URI links within web sites convey about the surfing and purchase history for the subscriber. Subscriber profile settings can be used to define product interests, how much on-line usage information can be shared and with whom, and under what conditions a subscriber wishes to receive an advertisement.

An advertiser index database is provided that assimilates, accesses, and stores data for advertising sales records including available slots (spots) for television advertisements, Internet advertisements, radio (audio) advertisements, and paper and digital yellow pages advertisements. The advertiser index database also stores information and data on registered advertisers and their advertisements including product category, various media versions of advertisements, auction prices for each media mode of delivery (audio, video, text), each access device type, coupon offers, location based offers, and product interest correlation score threshold settings that define the conditions for which specific advertisements should be delivered to a specific subscriber having a certain product interest correlation score.

The illustrative embodiment AKMS provides targeted advertising using multiple media types (e.g., video, HTML and associated browser plug-ins like flash, audio, text). Subscribers can input product interest criteria including product or service category, advertisement delivery scheduling deadline, and desired delivery access device (e.g., cell phone, PC, IP-based television service, mobile IP device). An interactive and/or dynamic web based interface (e.g., XML) to advertisers is provided to enable advertisers to dynamically in real time update advertising offers, auction prices, and threshold settings data for determining when an advertisement in a given product category should be delivered to a particular subscriber. This data is stored in the advertiser detail information 218.

Independent of the specific dynamic process of keeping the product interest correlation scores in a product interest correlation scoring matrix including but not limited to product categories and product interest correlation scores for the product categories. The product correlation scoring matrix is updated dynamically for each subscriber in real time by the ICSS 212, the spidering process 214 can occasionally be run as a supporting process, scanning the Internet (similar to search engine engines) and classifying web links based on implied intent of subscribers visiting the page. Rather than indexing for search, in an illustrative embodiment the spidering process provides the AKMS with categorization information. For example, at a particular time the URI of http://www.buyatoyota.com/zipCodeEntry.aspx?zip_code=78726&series_code=25&series_name=&model_code=&s_van=GM_STM_FLS can be logged in the web spidering results database and used to ascertain that anyone accessing this link is not only interested in a particular car model, but actually was serious enough to inquire about local dealers and associated offers in their area. This can be determined by the spidering system employing a combination of indexing and natural language parsing and processing of text the spidering system finds on the page. This spidering information can be used to create a high product interest correlation "contribution" score for Autos→By Make→Manufacturer→Model as well as Autos→By Style→Sedans→Midsize→Manufacturer Model. When a subscriber subsequently surfs to this link, the "contribution" score can be added to the subscriber's current product interest correlation score for this particular category. It should be noted that such a detected interest would increase the product interest correlation scores at each leg of the tree for both paths for which the manufacturer's model is a terminal value.

In an illustrative embodiment, the components and processes defined herein as part of the illustrative system and method AKMS 108 are intended for processing in real time as events occur. The associated modules that support the AKMS 108 provides messaging to the ICSS 212 interactively (e.g. via XML or a web services framework) so a product interest correlation scoring matrix can be updated for the subscriber in real time. The product interest correlation scoring matrix contains data indicating a product interest correlation score for a number of products and categories.

A significant amount of product interest information for each subscriber is obtained by the Internet profiling process 230 that is capable of receiving subscriber event data indicating subscriber surfing history from independent network service providers, including wireless 3G cellular, DSL, cable modem, broadband fiber, and IPTV. In an illustrative embodiment the Internet profiling process 230 employs a media controller that is capable of logging URIs visited within a subscriber's web browser, and/or performing deep packet inspection when desired to ascertain specific content and/or services that are being consumed by a subscriber over the Internet, and assesses packet flows to the subscriber to gauge more specifically what types of activities are being performed (e.g., services of interest, specific services/applications run, duration, location, etc.). (Media controllers that perform flow based packet analysis, available from vendors like Caspian Networks, can be used for this purpose.)

Regardless of access network and device used, the profiling process 230 usually will be able to identify the subscriber via single sign-on (SSO) credentials, and then maintains a URI history log for the identified subscriber. The SSO credentials can be defined and cached in the access device (e.g. television set top box, cell phone, PC, laptop, etc.) to avoid requiring the subscriber to sign in each and every time the Internet is accessed with such a device. This would likely be managed by an HTML cookie or similar mechanism to "time out" the login credentials if desired for security purposes. Alternatively, unique identifying information obtained from the access device (e.g. cellular phone number, MAC address, product serial number) may be used to infer SSO credentials. The Internet profiling process 230 would typically reside in the IP network 106, specifically in the routing framework providing Internet access. The routing framework provides a centralized point to monitor and profile subscriber surfing history, traffic characteristics, port usage, etc. with which to monitor activities by the subscriber. This information would only be used based on positive privacy allowance or opt-in settings 206 defined by the subscriber allowing specific monitoring permissions. It is likely that profile subscriber history data information may be obtained from disparate access networks, even those operated by independent network service providers, which may be combined to make a "complete view" (stored in a user profile) of subscriber usage history across multiple access devices and networks plausible. The internet profiling process 230 also includes the ability to accept data feeds (e.g. in XML or other suitable data format) from other network providers that summarize the subscriber historical usage and Internet surfing information data obtained from profiling processes within their own independent network.

Figure 3:
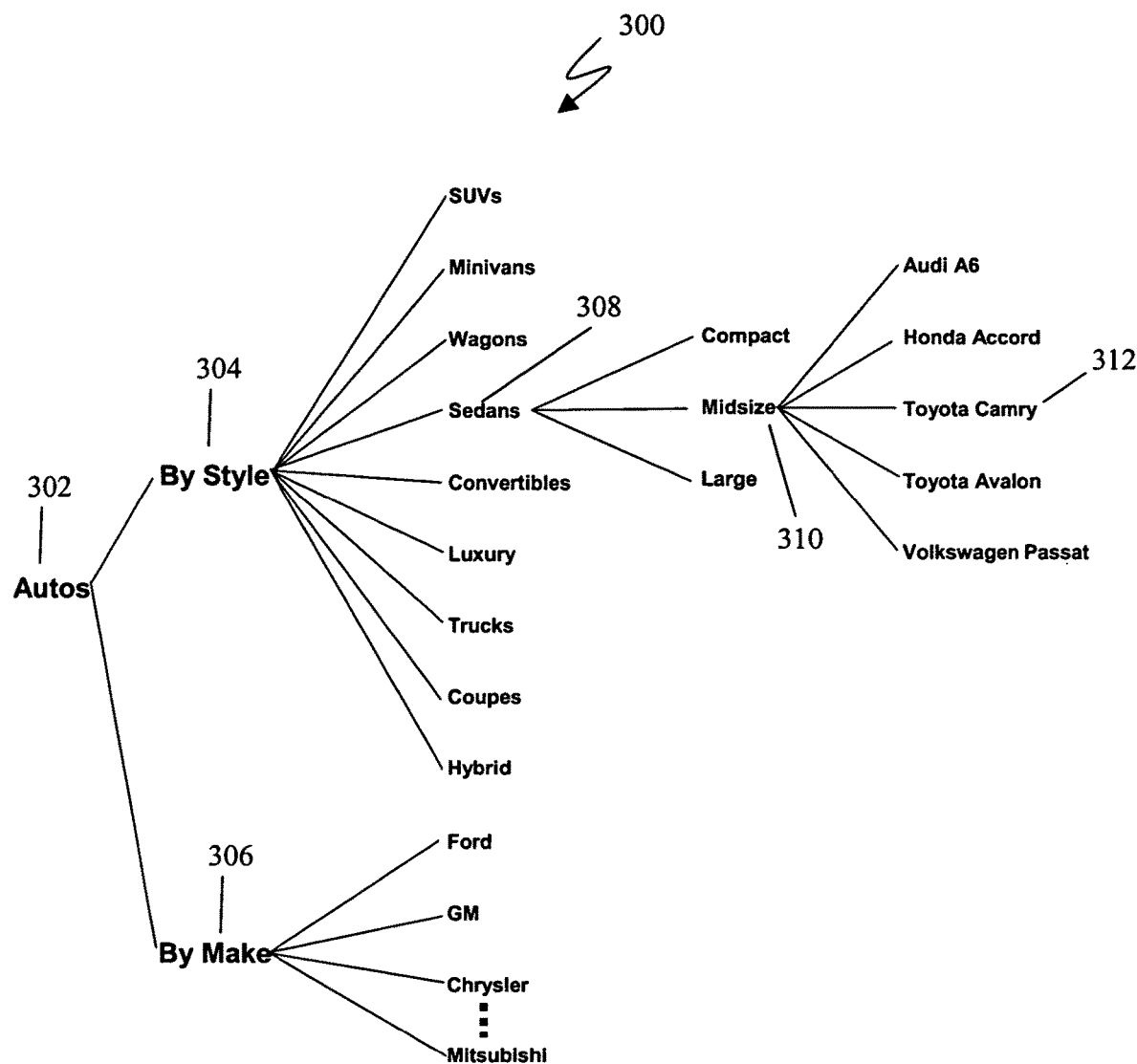
FIG. 3 is a schematic of an illustrative embodiment depicting a categorization tree showing one possible navigation path to find a product category for a specific product.

Turning now to FIG. 3, FIG. 3 illustrates a category tree structure 300 maintained by the ICSS 101 could be navigated along one path to derive the product category for a specific product, in this case a Toyota Camry. It should be noted that the same product could be the terminal value for one or more additional navigation paths through the categorization tree structure as well.

The illustrative ICSS 101 maintains a detailed, hierarchical categorization that is dynamically extensible as new product categories materialize in the marketplace. For example, one example category tree navigation to find Toyota® Camry® cars would be Autos 302→By Style 304→Sedans 308→Midsize 310→Toyota® Camry® 312. Similarly, another way to find Toyota® Camry® might be via Autos→By Make→Toyota®→Toyota® Camry®. Beneath the Camry® category there could be additional categorization for interest in new versus used models. If some activity on behalf of the subscriber causes the ICSS 101 to conclude that there is product interest in the Camry®, the corresponding correlation score for Camry® would increase for the subscriber.

It should be noted that such a detected interest would increase the product interest correlation scores at each leg of the tree for all paths (e.g. Autos 302→By Make 306→Toyota®→Camry® as well as Autos→By Style→Sedans→Midsize→Toyota® Camry®) for which Camry® is a terminal value.

Example technologies that can used to facilitate the messaging to the ICSS 101 to accomplish its correlation scoring procedure include but are not limited to extended markup language (XML), RDF, DAML and OIL. A total product interest correlation score is calculated by factoring in demonstrated levels of interest in a particular product category via a variety of usage patterns for a subscriber. The magnitude of the correlation score stored in the product interest correlation score matrix accessible to the ICSS 101 for one particular category for the subscriber defines a subscriber's interest level in a product or product category. In practice the final product interest correlation score is tallied by evaluating surfing habits, TV viewing habits, personal profiles expressing proactive product interest, phone calling logs/habits, content of other communications tasks like IM, electronic mail, video telephony, and previous purchases. Timing, frequency, and access of multiple unrelated pieces of information having some correlation to the category are all factored into computing the total correlation score for a category.

Figure 4:
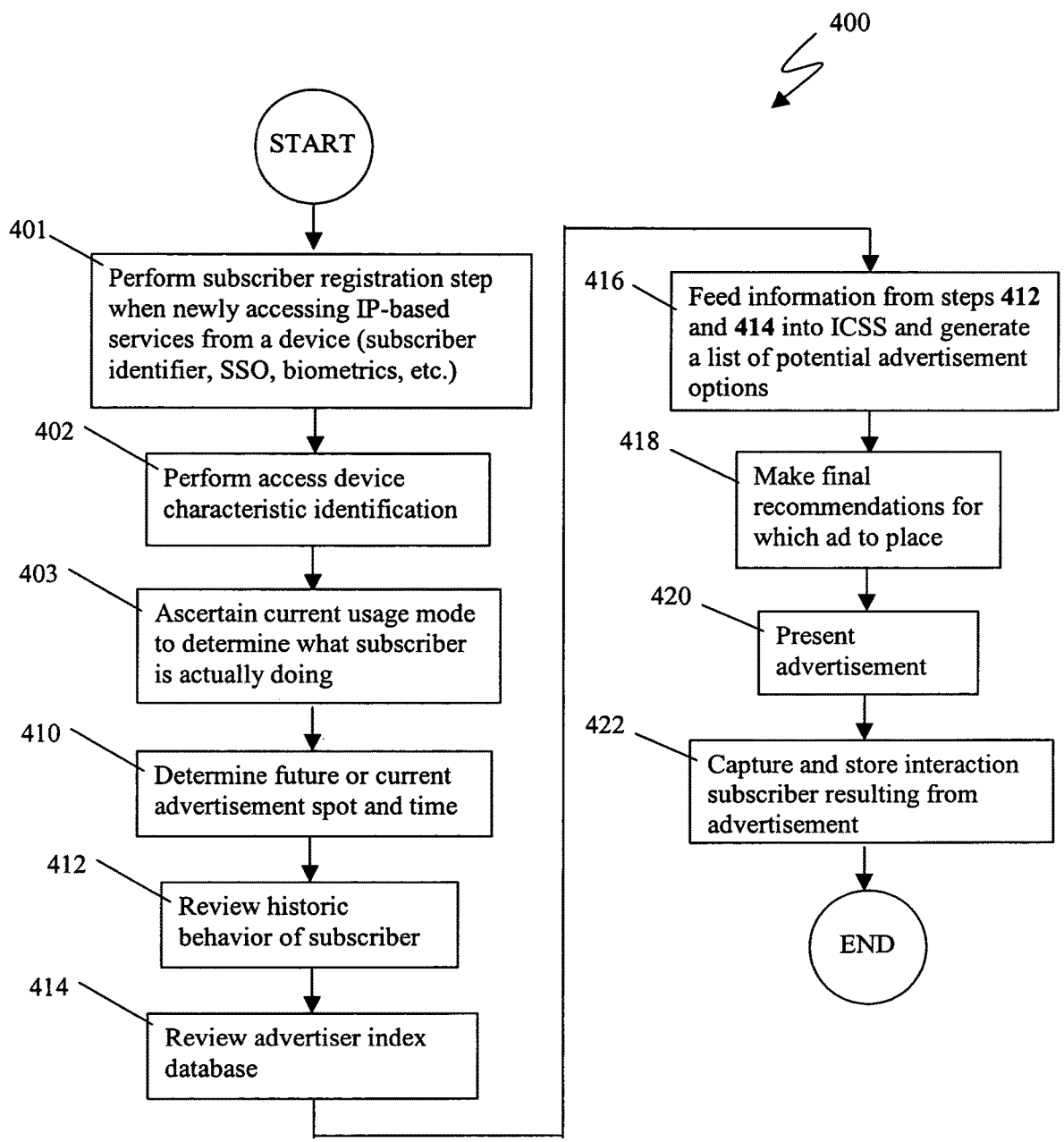
FIG. 4 is a flow chart of an illustrative embodiment of a method to determine which advertisement to select to send to a subscriber at a particular opportunity or time.

FIG. 4 portrays the illustrative steps taken to select which advertisement to target/send to a subscriber at a particular opportunity or time. First, a subscriber registration step 401 is performed when initially accessing IP-based services from a device. A subscriber registers (via an access device) with the IP network. This registration prepares the IP network for an advertisement triggering the AKMS into standby mode. One example of registration automatically occurring is by turning on the IPTV service while at home. The IP network is able to ascertain the subscriber identity, or if there is a family of subscribers an easy method for delineation among family members can be supported by the IPTV set top box (STB) (e.g. typing in a 4-digit PIN for tracking subscriber activity such as monitoring television channel changing behavior). Another way to identify a subscriber is by SSO technology, where the subscriber authenticates on a device with single sign-on (SSO) credentials, or the device uses cached SSO information to automatically logon and make the authentication implicit for the subscriber.

Next, an access device characteristic identification 402 occurs. This step determines whether the characteristics of the device currently being used by the subscriber for Internet access are known. This may be validated by checking a medium access control (MAC) address or a database table which records previous access devices used by the subscriber, sorted by MAC address. If the subscriber access device characteristics are known, device parameters including screen resolution, audio/video capabilities, supported advertisement modes (e.g. TV advertisement, audio advertisement, web browser advertisement, MMS, SMS, phone call) are loaded. If device characteristics are not known, the process interrogates the subscriber and/or access device to obtain device characteristics from subscriber, and these characteristics are then incorporated into a device database table in memory for future use.

After some time, a subscriber begins to interact with IP network application or begins to consume content over the IP network. Details regarding the information/application being consumed are communicated to the AKMS 108. One example would be the subscriber selecting "Travel Channel" to watch on the IPTV service. The channel is broadcasting a show on the ruins of Rome. This information is communicated to AKMS 108. At block 403 an illustrative embodiment determines what the subscriber is actually doing at the moment, including but not limited to watching an IPTV stream, browsing the Internet, chatting, IM, talking on a cell phone, moving close to a advertiser location or perhaps doing nothing.

The AKMS 108 now carries out the following actions— first, AKMS accesses the advertisement detail information and determines the future anticipated spot (and time) 410 for the advertisement—the commercial window in the content to place advertisements. Second, it reviews historic behavior 412 of the subscriber relative to the subject—in this case traveling. For example, did the subscriber recently shop for tickets or hotels on the web or via the phone? If so, did the shopping action consummate in a transaction? Does the subscriber have frequent flyer miles? Has the subscriber indicated preferences regarding receiving travel related promotions? What is the subscriber's preference for dining and hotels and transportation? What is the likelihood of the subscriber to consume complementary products? How large is the subscriber's family? It should be noted that the review of historic behavior 412 is not limited to the subscriber's current usage mode 403. The subscriber's history of use may have resulted in a high product category score for something totally unrelated to the "Travel Channel," for which an advertiser is willing to pay an acceptable price for delivering the advertisement in a format that the subscriber's current access device characteristics 402 are best suited for. There also may be advertisements queued for delivery on such a device based on past usage modes 403.

Third, the AKMS reviews the advertiser index database 414 to determine whether there is any advertiser on the related subject, complementary subject, or even a product unrelated to the current subscriber behavior that has an advertisement for a product category in which the subscriber has a high product correlation score, who desires to send an advertisement to this subscriber at this moment or at a later time. For example, are any airlines, hotels, restaurants, cruises, travel agents, etc. complementary to this subject? Is there an advertisement/promotion specifically for Rome? What is the advertiser's willingness (auction bid) to pay for the advertisement to be delivered, based on the product interest correlation score of the subscriber for travel, specifically to Rome? Which advertiser is the highest bidder? Is there a high bidder who wants to deliver an advertisement well suited for the current access device or suited for delivery at a later time, given there is a high product correlation score that gives the advertiser reason to believe the subscriber may be interested in their product regardless of current subject inferred through subscriber use? Fourth, information from steps two and three above are fed into the ICSS 212 and the current product interest correlation score for the user (periodically updated by recent event data), advertiser bid prices and viable formats based on the device characteristics 402 are used to generate a list of potential advertisement 416 to be sent to a subscriber either now or later. Note that this is not just matching the historic behavior 412 with the related advertising offers 414, but also associating other contextual information about the subscriber (example, presence, location, etc.) and advertiser (example, ranking, advertiser auction bid, willingness to pay, etc.). Such contextual information can include (but is not limited to) access device capabilities, subscriber's preference for style and format of an advertisement, advertiser's capabilities to deliver such an advertisement, subscriber location, subscriber profile settings, product interest correlation score, and current usage scenario, etc. The current usage scenario for a subscriber includes but is not limited to the activity in which a subscriber is currently involved (including but not limited to web surfing, chatting, IM, web logging (blogging), telephone calls, etc.) the access device being used (including but not limited to cell phone, PDA, laptop computer, personal computer, mobile IP devices, etc.) and location.

The AKMS 108 then selects 418 which advertisement from which advertiser to place and in which format to send the advertisement to the subscriber access device (and on which access device) within the commercial spot (advertisement window) during the show or otherwise. This may involve sorting of the list, automated negotiation with advertisers in real time (or more likely a software agent defining bid rules and criteria for approving the sale of the advertisement) to dynamically negotiate auction bids for one advertiser or between two competing advertisers bidding against each other, etc.

The advertisement is then presented 420. The advertisement is rendered within the IP stream at the local, regional or central content delivery end in the IP network. Specific media format conversions are carried out and the final advertisement is generated and sent to a selected subscriber access device. Any interaction 422 resulting from the advertisement is captured and stored. Additional computations or fine tuning of the product interest correlation score (and associated list of advertisements) may be performed for the next commercial spot.

Figure 5:
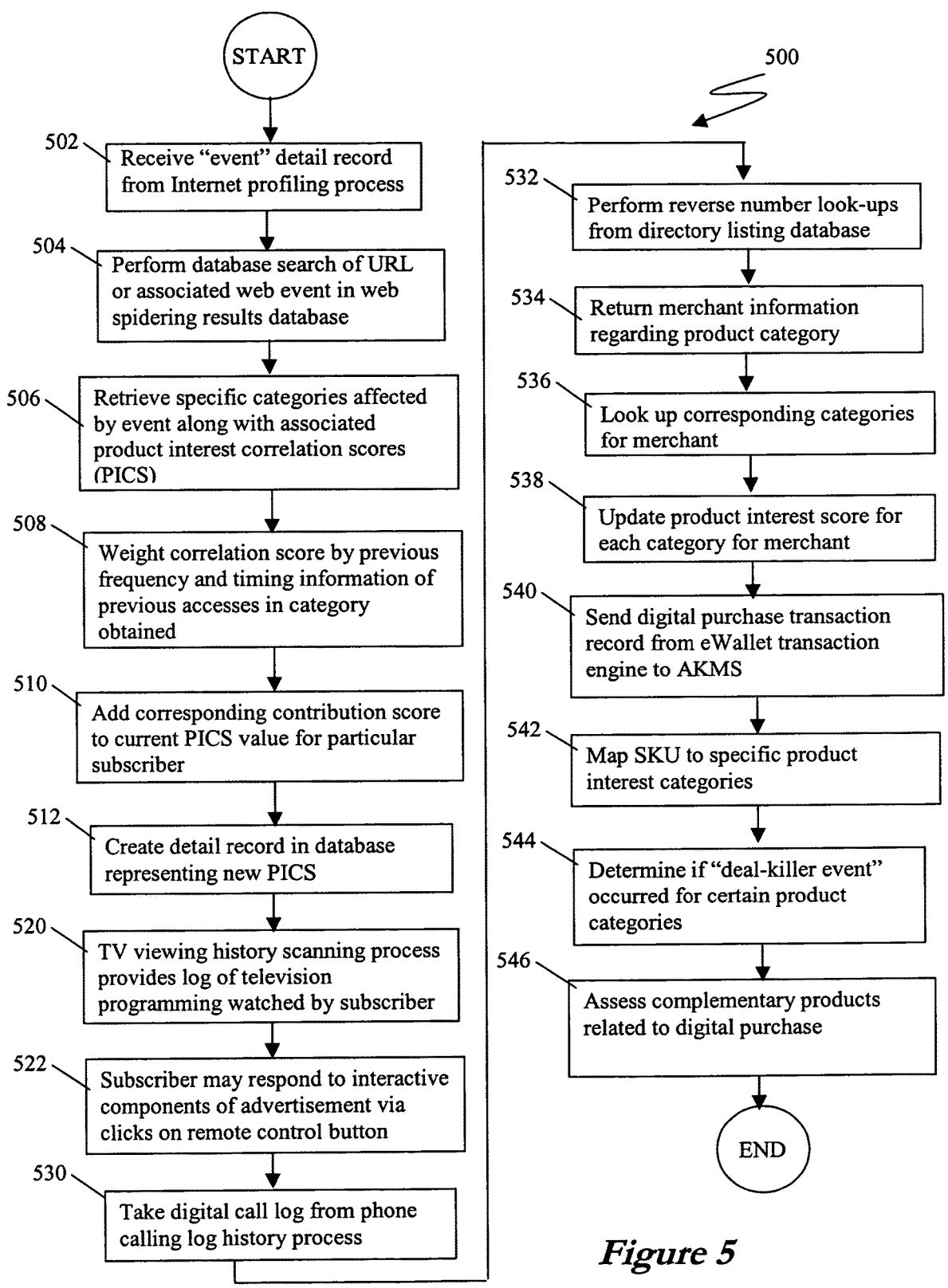
FIG. 5 is a flow chart showing an illustrative embodiment of a method of handling a subscriber event and updating the AKMS with information which can assist in developing product interest correlation scores for the subscriber.

FIG. 5 is a flow chart showing an illustrative embodiment of a method of handling subscriber events and updating the AKMS with information which can assist in developing the product interest correlation scores for the subscriber. Events include, but are not limited to, selecting a TV station, clicking on an interactive television advertisement, infomercial or menu selection option, browsing to a new web site, accessing or receiving via "push" technology information on the cellular telephone, sending electronic mails and instant messages, placing a standard telephone call.

In the case where the subscriber accesses a web page, content, or an IP-based service from any access device including personal computer (PC), IPTV set top box (STB), cell phone, etc. an event record detailing what the subscriber accessed from their access device is created. The ICSS 101 receives an event detail record 502 containing data from the Internet profiling process.

The ICSS 212 then performs a database search 504 of the URI or associated event data in the spidering results database 214. If the URI or other event exists in the database, the specific product categories affected by the event are retrieved 506 along with their associated product interest correlation scores and updated in the product interest correlation score matrix for the subscriber. Historic information regarding frequency and timing of previous accesses in this category is then obtained and used to "weight" a contribution score 508 accordingly. For each category in the product interest correlation score matrix, a corresponding contribution score is added to the current product interest score 510 for the particular subscriber.

A detail record is then created in the AKMS database block 512 representing this new information. (Note: The detail records for a particular subscriber and product or product category within the subscriber's product interest correlation score matrix can be used to re-create the current product interest correlation score for that category from scratch if desired). This can be implemented via physical and virtual schemas or database views such as in RDBMS, XML databases or object oriented databases, taxonomies or semantic resource descriptions using XML or RDF.

In the case where there is a television viewing event, the TV viewing history scanning process sends data representing a log of all television programming watched by the viewer 520, including commercials for which the subscriber may have responded to interactive components of the advertisement via clicks on the remote control 522 button. Similarly, data indicating commercials that were paused, rewound and viewed again, etc. can be sent to the AKMS 108. The television event includes, but is not limited to, watching a broadcast programming event and viewing a program stored on a digital video recorder.

In the case where a phone call has been placed, the phone calling log history process as part of the Internet profiling process 230 takes a digital call log 530 from a PSTN phone, cell phone, VoIP phone, or combination thereof and performs reverse number look-ups 532 from a directory listing database to ascertain what merchants may have been called. The merchant information is returned 534, which the AKMS 108 uses to look up the corresponding product categories 536 for the merchant, updating the product interest score 538 for each product interest category. Additionally, the communications history 238 may include other digital communication methods including IM, electronic mail, and video telephony/conferencing. Similar to the parsing and natural language processing techniques used by the web spidering process 214 to assess product category interest intent by the subscriber, text from IM and electronic mail applications could similarly be parsed for product interest categorization. Categorization based on video telephony/conferencing could additionally employ speech recognition technology.

Product interest categories are essentially unlimited but may be represented by general categories including but not limited to sports, fashion, business, movies, etc.

In the case of a digital purchase, a digital purchase transaction record is sent 540 from the eWallet transaction engine to the AKMS 108. In case where the cell phone or mobile subscription is used as a form of currency (or eWallet), such transaction associated with billing the subscriber mobile account is also captured. The AKMS 108 can use stock keeping unit (SKU) number of product(s) purchased and map the SKU numbers to specific product interest categories 542. The system then determines if this purchase represents a "deal-killer event" 544 for certain product categories. For example, if the item is not perceived to be a quickly perishable item and may impact future purchase opportunity in a specific category (e.g. customer finally buys the Toyota® Camry®) the product interest correlation score for that category within the subscriber's matrix is reduced, if not zeroed out or blocked in its entirety for a period. Similarly, the system assesses whether there are complementary products 546 related to the digital purchase. Products known to be complementary to the purchase have product interest scores increased by a pre-defined "contribution" to the score.

It should be noted that any of preceding cases can be logged by the respective module, and transferred in bulk for handling by the AKMS 108 in batch mode on a scheduled basis also. In the more ideal dynamic mode for Internet profiling, for example, each URI visited or other event detected by the flow-based analysis process within the media controller would immediately send a message to the AKMS 108 so that the AKMS can treat each new piece of information or event in real-time and thus quickly provide an accurate product information scoring summary for the subscriber in real time. Alternatively, some information may be obtained in non real time—examples include data feeds from third party access networks, or perhaps a transaction log from another service (e.g. phone calling log) that is not capable of providing information in real time.

Figure 6:
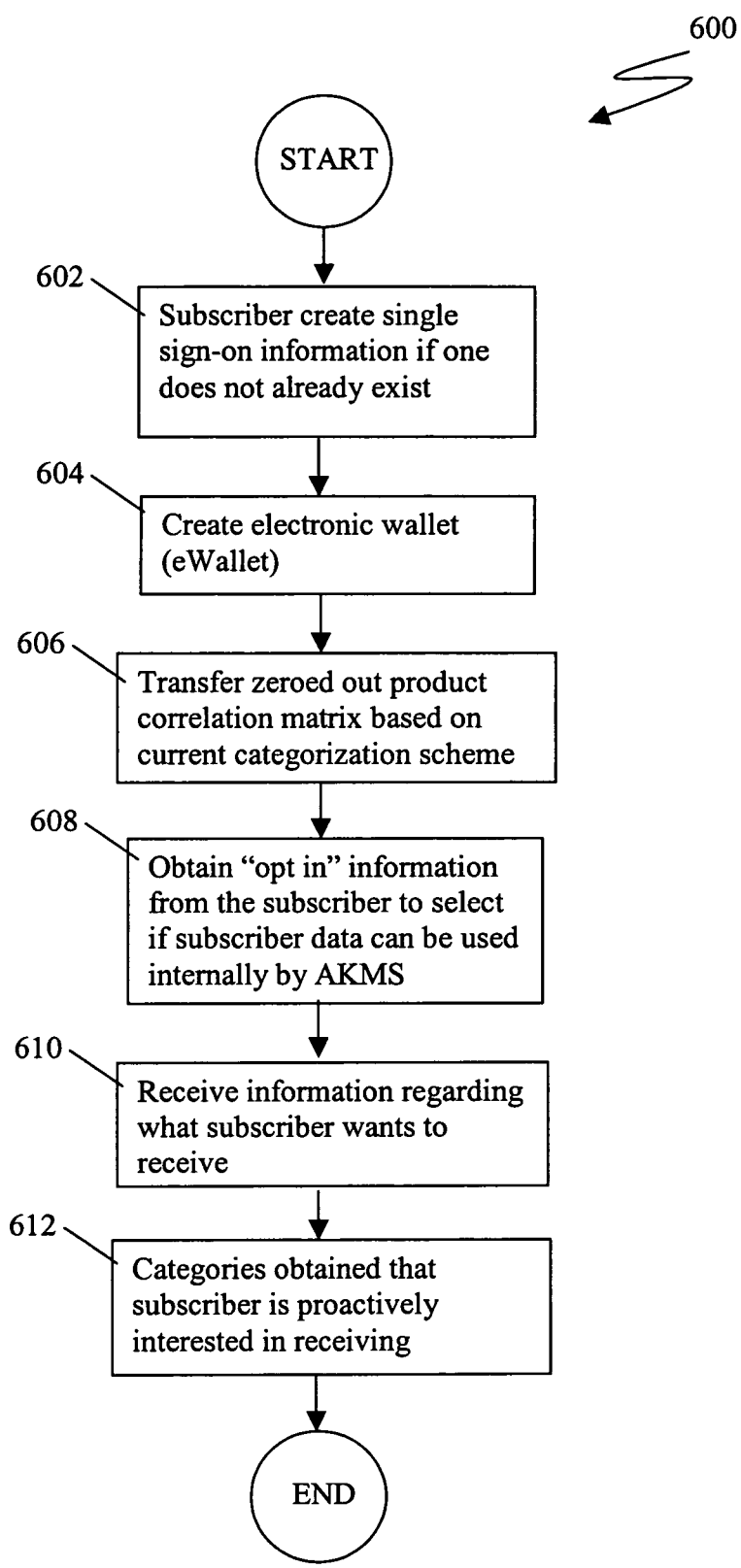
FIG. 6 is a flow chart showing an illustrative embodiment of a method of subscriber enrollment, registering a new subscriber of the IP-based services and advertising system.

FIG. 6 illustrates a method of subscriber enrollment, i.e., handling a new subscriber of the IP-based services and advertising system for this first time. The subscriber first creates single sign-on (SSO) information 602 if one does not already exist, obtaining desired subscriber ID and password with which to authenticate from all devices used henceforth. Next, an electronic wallet (eWallet) is created 604 for the subscriber by obtaining online payment information and storing it in the subscriber's profile. Alternately the eWallet is associated with the mobile subscription, in the case of the cellular subscription being used as a wallet. A zeroed out product correlation matrix is transferred 606 based on the current categorization scheme employed by the ICSS 101.

The steps that follow encompass setting the personal profile settings; including obtaining what information they are willing to have stored in the subscriber profile settings and used to help generate product interest correlation scores. It is important to note from a privacy perspective that none of this information is shared with advertisers by default; rather it is stored and used internally by the AKMS 100 to generate product interest correlation scores.

Obtaining "opt in" (privacy setting) information 608 lets the subscriber enter data to select whether the event data can be used internally by the AKMS 100 to help in the advertisement targeting process: e.g., phone calling log; Internet surfing log for specific devices; TV viewing history; interactive television clicks; electronic mail, IM, video telephony, application usage and digital purchase history. The subscriber is also capable of changing opt in permissions for the AKMS to utilize any of the above information at any time, and even suspend its use temporarily if desired.

Obtaining what information the subscriber wants to receive 610 allows subscribers to create not only an approved "global" solicitation subscriber profile for advertisers, but can also customize advertising delivery methods based on product categories. Subscribers can thus personalize and select whether they wish to receive targeted TV advertisements, targeted Internet advertisements (banners in the browser, pop-ups, etc.) to their PC or laptop, text messages (SMS) and/or Multimedia messages (e.g. MMS) to their cell phone, electronic mail messages, audio recordings sent via a computer telephony system to the subscriber's phone, direct contact, and U.S. mail and electronic coupon offers.

Obtaining which categories and product categories in which the subscriber is proactively interested in receiving information on 612 lets subscriber select categories of interest for which they would like to be solicited with targeted advertisements and coupon offers. Subscribers can always update their proactive product category interests subsequent to this initial enrollment.

Figure 7:
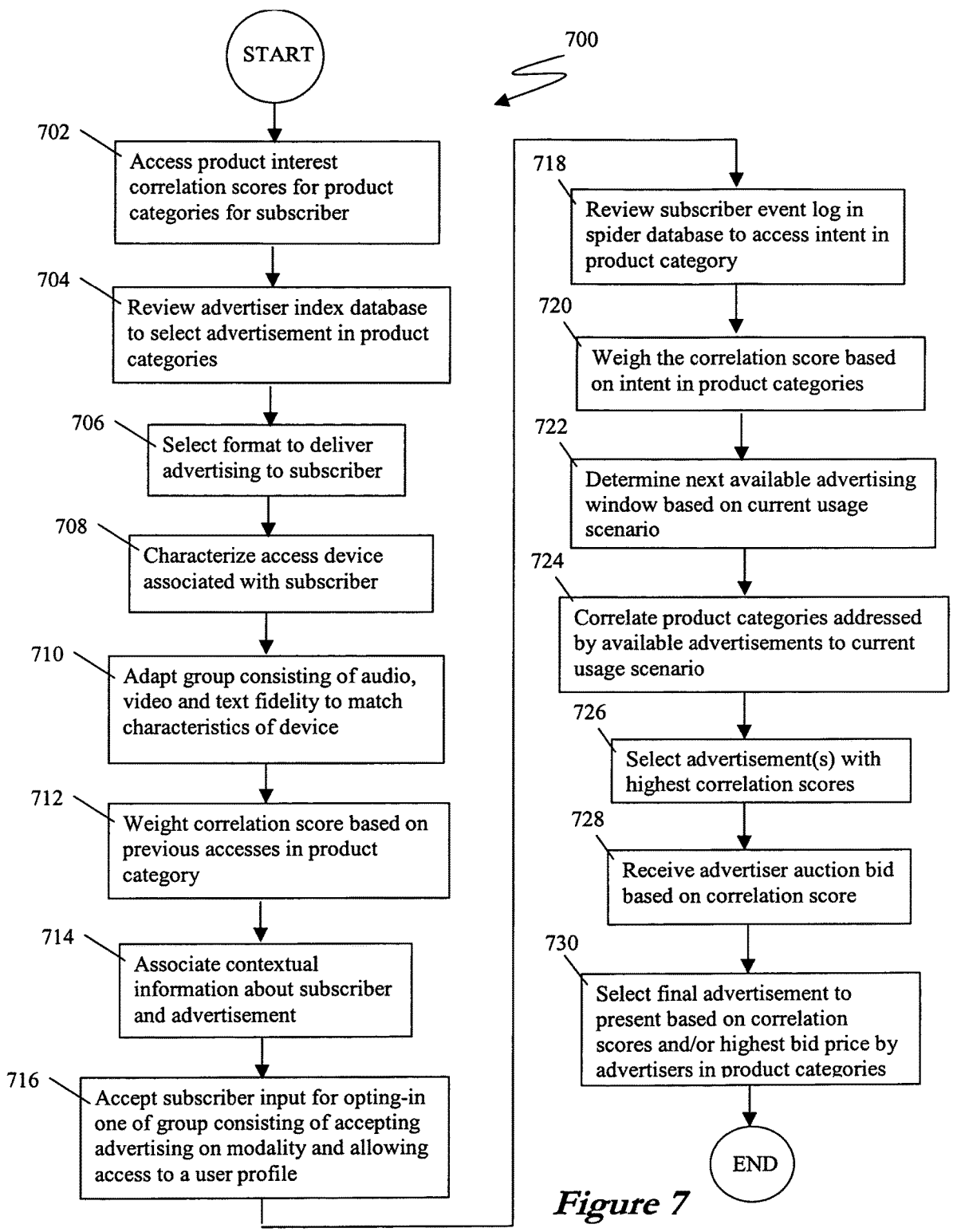
FIG. 7 is a flow chart showing an illustrative embodiment of a method for selecting an advertisement to send to a subscriber.

Turning now to FIG. 7, FIG. 7 is a flow chart of an illustrative embodiment where product interest correlation scores 702 are retrieved for a product category for a subscriber. The correlation score is already calculated and is updated periodically in real time as event data is monitored and the Internet profiling process has been occurring. An advertiser index database 704 is reviewed to select an advertisement in the respective product categories. Format 706 is selected to deliver advertising to the subscriber, based on advertiser attributes that define willingness to pay for certain delivery modes based on the subscriber's correlation score for the product categories. Access device 708 is characterized as associated with the subscriber. Audio, video and text fidelity 710 are adapted to match characteristics of the subscriber access device. Product interest correlation score 712 is weighted based on previous accesses, and how recently and the frequency of the accesses in the product categories by the subscriber. Contextual information 714 about subscriber and advertisement is associated. Subscriber input for opting-in one of the groups is accepted consisting of accepting advertising on access device or modality and allowing access to a profile. The subscriber's event log in the spidering database is then reviewed 718 to assess intent in product categories from the URI access. The product interest correlation score 720 of the subscriber is weighted based on intent in the product category. The next available advertising window 722 is determined based on a subscriber's current usage scenario. Product categories addressed by available advertisements 724 are correlated to current usage scenario. Multiple advertiser auction bids 728 can be received based on the product interest correlation score. Advertisements 726 are selected with highest correlation scores matching the subscriber's product interest correlation score. The correlation score for the advertisement is based on a comparison of the product category for the advertisement and the product interest correlation score for the subscriber. Finally, the final advertisement to present is selected 730 based on correlation scores and/or highest bid price by advertisers.

Figure 8:
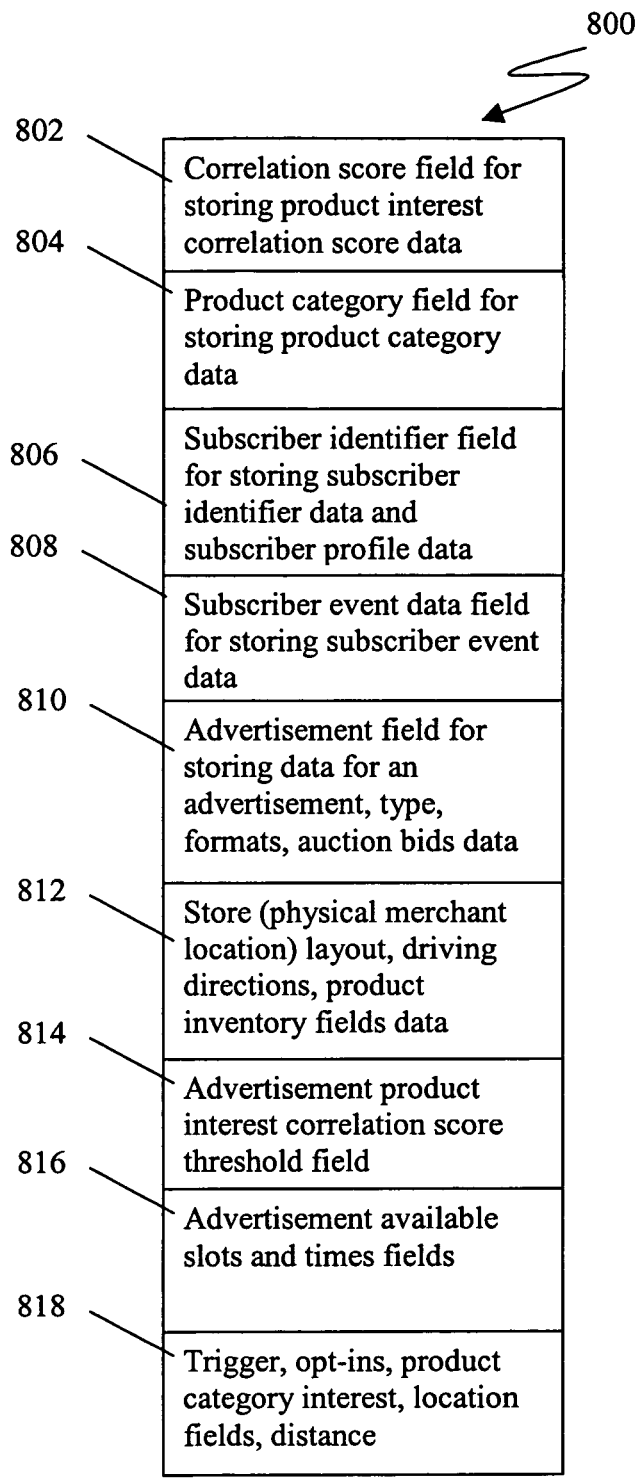
FIG. 8 is a schematic diagram of a data structure in an illustrative embodiment.

Turning now to FIG. 8, FIG. 8 illustrates a data structure for storing targeted advertising data intended for a subscriber in memory. A correlation score field is provided in the data structure for storing product interest correlation score data 802. A product category field is provided for storing product category data 804. A subscriber identifier field is provided for storing subscriber identifier and subscriber profile data 806. A subscriber event data field is provided for storing subscriber event data 808 for determining a subscriber's product interest correlation score in a product category. An advertisement field is provided for storing data for an advertisement 810, related product category type, advertisement format and auction bids. Store (a physical merchant location) layout, driving directions, and store product inventory data are stored in a location field 812. Advertisement product interest correlation score threshold data is stored in product correlation interest score field 814. Advertisement available slots and times data are stored in advertisement available field 816. Trigger, opt-ins, product category interest, distance and location are stored in trigger and opt-in fields 818. A trigger can be set to send an advertisement to subscribers having a product interest correlation score greater than a product interest correlation score threshold and within a given distance from a specified location.

Figure 9:
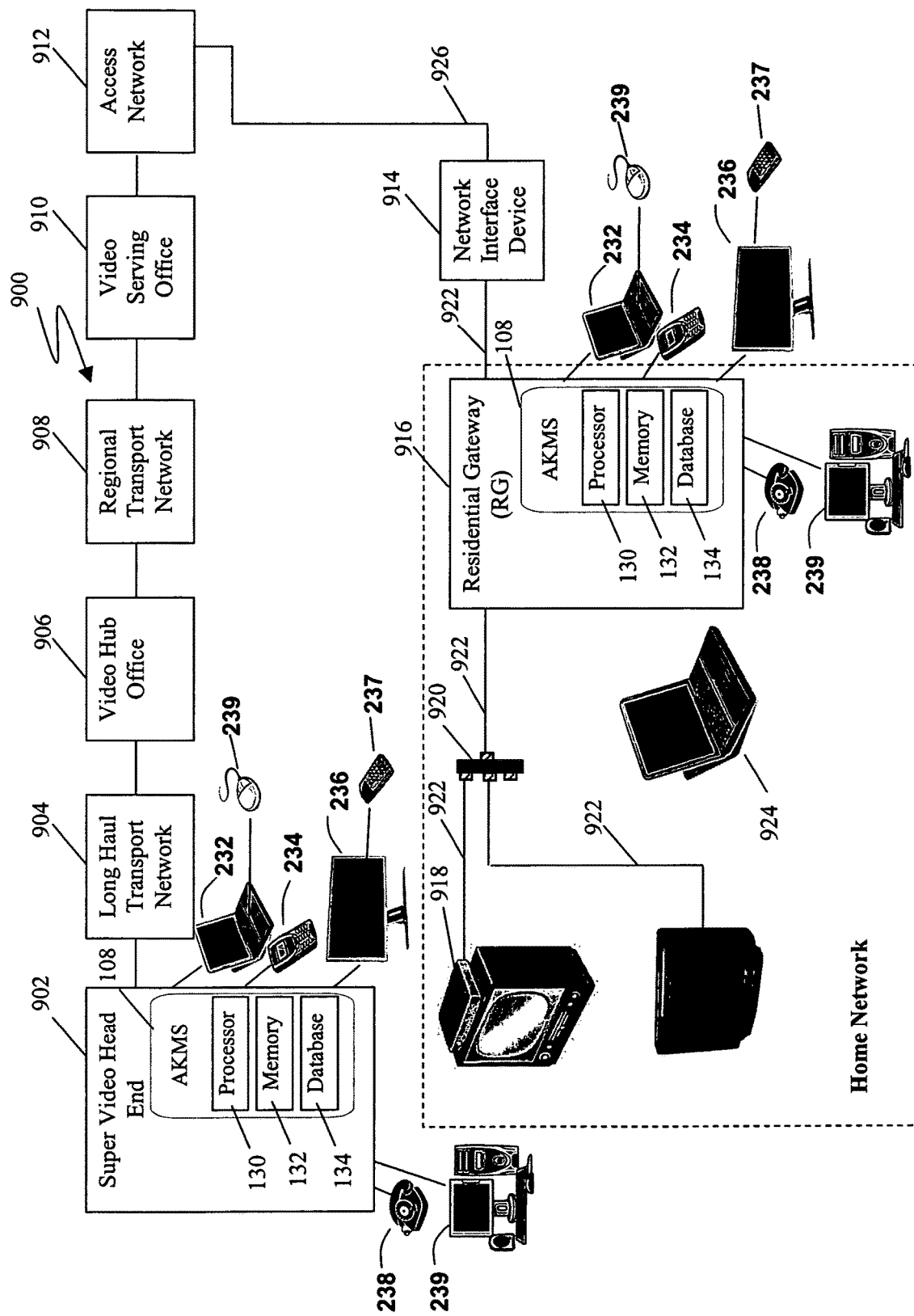
FIG. 9 is a schematic diagram of an illustrative embodiment showing an AKMS in an IPTV system.

Turning now to FIG. 9, FIG. 9 is a schematic diagram of an illustrative embodiment showing an AKMS in an IPTV system. As shown in FIG. 9, in an illustrative embodiment, an AKMS 108 may be associated or contained in a super video head end 902, a residential gateway 916 or a set top box 918. As shown in FIG. 9, the super video head end 902 (e.g., satellite ground station that receives channels via satellite and encodes for distribution over IP network) relays a video and data signal to a long haul transport network 904 (e.g. Gigabit Ethernet). The processor that hosts or is associated with the AKMS also monitors subscriber event data inputs associated with the subscriber access devices. The subscriber event data is monitored by the AKMS 108. As discussed above, event data may be collected from subscriber communications as a subscriber uses a subscriber access device (or inputting files created by a service provided based on subscriber verbal or text input), including creating a user profile, or various other activities discussed above, including but not limited to using a subscriber access device which may include but is not limited to a PSTN telephone 238, cell phone 234, personal computer 239, PDA, computer mouse 239, or IPTV receiver 236 and input device, such as a remote control 237, web tablet, lap top computer, pocket PC, and mobile IP device. The AKMS includes a processor 130 coupled to memory 132 and database 134 in memory. A computer readable medium containing instructions that can be executed by the processor is embedded in the memory.

The long haul transport network 904 relays the video and data signal to the video hub office 906 (e.g., metro office that receives video and data from super video head end (HE) and inserts local channels). The video hub office 906 relays the signal to the regional transport network 908 (e.g. Gigabit Ethernet). The regional transport network 908 relays the signal to the video serving office 910 (e.g. Telco Central Office delivering voice, data, and video to neighborhoods via Gigabit Ethernet links). The video serving office 910 relays the signal to the access network 912 (e.g. fiber to the Home Network, fiber to the Node Network with very high data rate video subscriber line (VDSL) delivery to the home). The access network 912 relays the signal via a fiber optic link (if fiber to the home (FTTH) is used to carry the video and data) or telephone wiring (if fiber to the node (FTTN) is used to carry the video and data) 926 to the network interface device (NID) 914. The NID 914 relays the signal via the coaxial cable 922 to a gateway such as a residential gateway (RG) 916. The AKMS includes a processor 130 coupled to memory 132 and database 134 in memory. A computer readable medium containing instructions that can be executed by the processor is embedded in the memory. From the RG 916 the signal is relayed via the coaxial cable 922 to the coaxial splitter 920, which splits the signal via coaxial cables 922 to an STB 918, and other television sets on the home network. The signal can also be sent to laptop computers 924. The above example is for illustration only and can be implemented in numerous different ways in an IPTV system.

Figure 10:
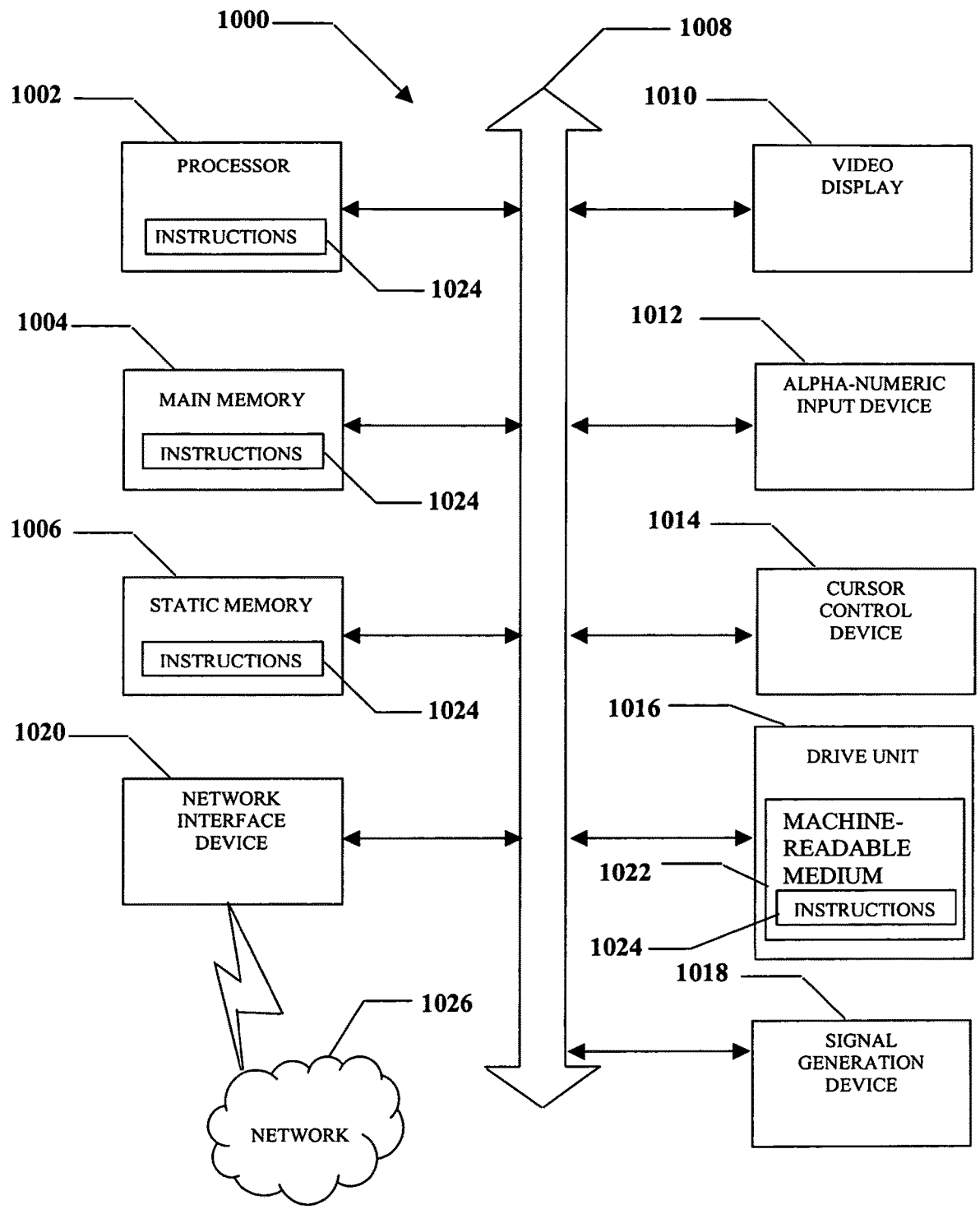
FIG. 10 is a diagrammatic representation of a machine in the form of a computer system within which a set of instructions, when executed, may cause the machine to perform any one or more of the methodologies of the illustrative embodiment.

Turning now to FIG. 10 the computer system 1000 may include a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., liquid crystals display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated in herein above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The invention claimed is:

1. A method, comprising:

accessing, by a processing system including a processor, a database comprising a search history of a first subscriber access device of a user, the database being generated by the processing system for a plurality of subscriber access devices;

detecting, by the processing system, electronic activity of the first subscriber access device in communication with a communication system;

analyzing, by the processing system, the electronic activity of the first subscriber access device to identify a first subscriber event;

searching, by the processing system, the database for a first product category according to the first subscriber event;

retrieving, by the processing system, from a plurality of product interest correlation score matrices, a first product interest correlation score associated with the first product category;

weighting, by the processing system, the first product interest correlation score according to frequency and timing information associated with previous accesses in the first product category determined according to the search history to generate a first contribution score;

adding, by the processing system, the first contribution score to the first product interest correlation score to update the first product interest correlation score;

accessing, by the processing system, the database comprising a phone calling log history including a log of phone numbers called by the first subscriber access device;

identifying, by the processing system, a product source according to a first phone number of the log of phone numbers, the first phone number being of a merchant that sells an item in the first product category and that was previously called by the first subscriber access device;

determining, by the processing system, product category information associated with the product source that is identified;

modifying, by the processing system, the first product interest correlation score according to the product category information to update the first product interest correlation score;

detecting, by the processing system, that the first subscriber access device is performing a digital purchasing activity; and responsive to the digital purchasing activity:

determining, by the processing system, a determined physical location of the first subscriber access device according to a location of a network element of the communication system, wherein the network element is used by the first subscriber access device to perform the digital purchasing activity;

selecting an advertisement, by the processing system, according to the first product interest correlation score and the determined physical location of the first subscriber access device;

selecting, by the processing system, a second subscriber access device associated with the user based on a determination that a determined physical location of the second subscriber access device is different from the determined physical location of the first subscriber access device;

adapting the advertisement and an advertisement format to match at least one characteristic of the second subscriber access device responsive to the processing system determining the at least one characteristic, wherein the at least one characteristic includes audio fidelity, video fidelity, text fidelity, or a combination thereof, resulting in an adapted advertisement; and queuing, by the processing system, the adapted advertisement for delivery to the second subscriber access device to enable presentation of the adapted advertisement at the second subscriber access device during an available advertising window that is determined by the processing system based on the digital purchasing activity, wherein the digital purchasing activity comprises advertisement selection in a product category based on a high auction bid.

2. The method of claim 1, wherein the database is generated by the processing system based in part on a call log received from the first subscriber access device.

3. The method of claim 1, wherein the first subscriber access device is a cell phone, and the second subscriber access device is one of a television or a television set capable of receiving IP based video services.

4. The method of claim 1, further comprising:
selecting, by the processing system, the advertisement based on previous event data for the user based on the second subscriber access device and a demographic for the user.

5. The method of claim 1, wherein the location of the network element is determined via triangulation.

6. The method of claim 1, further comprising:
receiving, by the processing system, a plurality of advertisers' auction bids in a plurality of product categories based on the first product interest correlation score; and
selecting, by the processing system, the advertisement having a highest bid from the plurality of advertisers.

7. The method of claim 6, wherein the plurality of advertisers' auction bids are for two or more of the plurality of product categories.

8. A non-transitory machine-readable storage medium, comprising executable instructions that, when executed by a processing system including a processor, facilitate performance of operations, comprising:

accessing a database comprising a search history of a first subscriber access device of a user, the database being generated by the processing system for a plurality of subscriber access devices;

detecting electronic activity of the first subscriber access device in communication with a communication system;

analyzing the electronic activity of the first subscriber access device to identify a first subscriber event;

searching the database for a first product category according to the first subscriber event;

retrieving from a plurality of product interest correlation score matrices, a first product interest correlation score associated with the first product category;

weighting the first product interest correlation score according to frequency and timing information associated with previous accesses in the first product category determined according to the search history to generate a first contribution score;

adding the first contribution score to the first product interest correlation score to update a first product interest correlation score matrix;

accessing the database comprising a phone calling log history including communication history associated with communications initiated by the first subscriber access device;

identifying a product source according to a first communication initiated by the first subscriber access device accessed at the communication history, the first communication corresponding to a phone number of a merchant that sells an item in the first product category and that was previously called by the first subscriber access device;

determining product category information associated with the product source that is identified;

modifying the first product interest correlation score according to the product category information to update the first product interest correlation score; and responsive to detecting that the first subscriber access device is performing a digital purchasing activity:

determining a determined physical location of the first subscriber access device according to a location of a network element of the communication system wherein the network element is used by the first subscriber access device to perform the digital purchasing activity;

selecting a second subscriber access device associated with the user based on a determination that a determined physical location of the second subscriber access device is different from the determined physical location of the first subscriber access device;

selecting an advertisement associated with a third party entity, wherein the selecting of the advertisement is based on a threshold set by the third party entity;

adapting the advertisement and an advertisement format to match at least one characteristic of the second subscriber access device responsive to the processing system determining the at least one characteristic, wherein the at least one characteristic includes audio fidelity, video fidelity, text fidelity, or a combination thereof, resulting in an adapted advertisement; and queuing the adapted advertisement for delivery to the second subscriber access device to enable presentation of the adapted advertisement at the second subscriber access device during an available advertising window that is determined by the processing system based on the digital purchasing activity, wherein the digital purchasing activity comprises advertisement selection in a product category based on a high auction bid.

9. A device, comprising:

a processing system including a processor; and a memory that stores executable instructions that, when executed by the processing system, facilitate performance of operations, comprising:

accessing a database comprising a search history of a first subscriber access device of a user, the database being generated by the processing system for a plurality of subscriber access devices;

detecting electronic activity of the first subscriber access device in communication with a communication system;

analyzing the electronic activity of the first subscriber access device to identify a first subscriber event;

searching the database for a first product category according to the first subscriber event;

retrieving from a plurality of product interest correlation score matrices, a first product interest correlation score associated with the first product category;

weighting the first product interest correlation score according to frequency and timing information associated with previous accesses in the first product category determined according to the search history to generate a first contribution score;

adding the first contribution score to the first product interest correlation score to update a first product interest correlation score matrix;

accessing the database comprising a phone calling log history including communication history associated with communications initiated by the first subscriber access device;

identifying a product source according to the communication history including a first communication initiated by the first subscriber access device, the first communication corresponding to a phone number of a merchant that sells an item in the first product category and that was previously called by the first subscriber access device;

determining product category information associated with the product source that is identified;

modifying the first product interest correlation score according to the product category information to update the first product interest correlation score;

detecting that the first subscriber access device is performing a digital purchasing activity;

responsive to the digital purchasing activity, determining a determined first physical location comprising a physical location of the first subscriber access device according to a location of a network element of the communication system, wherein the network element is used by the first subscriber access device to perform the digital purchasing activity;

selecting an advertisement according to the determined first physical location and the first product interest correlation score;

according to an operational capability of the first subscriber access device, selecting a second subscriber access device of the user that is located at a determined second physical location that is different from the determined first physical location;

adapting the advertisement and an advertisement format to match at least one characteristic of the second subscriber access device responsive to the processing system determining the at least one characteristic, wherein the at least one characteristic includes audio fidelity, video fidelity, text fidelity, or a combination thereof, resulting in an adapted advertisement; and subsequent to the digital purchasing activity, queuing the adapted advertisement for delivery to the second subscriber access device to be presented during an available advertising window responsive to detection of a consumption of content at the second subscriber access device by the user that is determined by the processing system based on the digital purchasing activity, wherein the digital purchasing activity comprises advertisement selection in a product category based on a high auction bid.

10. The device of claim 9, wherein the advertisement is associated with a third party entity, wherein the selecting of the advertisement is based on a threshold set by the third party entity.

11. The device of claim 9, wherein the location of the network element is determined via triangulation.

12. The non-transitory machine-readable storage medium of claim 8, wherein the second subscriber access device is selected according to an operational capability of the first subscriber access device.

13. The non-transitory machine-readable storage medium of claim 8, wherein the advertisement is selected according to the first product interest correlation score and the determined physical location of the first subscriber access device.

14. The non-transitory machine-readable storage medium of claim 8, wherein the advertisement is to be presented at the second subscriber access device responsive to detection of a consumption of content at the second subscriber access device.

15. The non-transitory machine-readable storage medium of claim 8, wherein the first subscriber access device is a cell phone and the second subscriber access device is a television set capable of receiving IP based video services.

16. The non-transitory machine-readable storage medium of claim 8, wherein the first subscriber access device is a cell phone, and the second subscriber access device is a television.

17. The non-transitory machine-readable storage medium of claim 8, the operations further comprising:

selecting the advertisement based on previous event data for the user based on the second subscriber access device and a demographic for the user.

18. The non-transitory machine-readable storage medium of claim 8, wherein the location of the network element is determined via triangulation.

19. The non-transitory machine-readable storage medium of claim 8, the operations further comprising:

receiving a plurality of advertisers' auction bids in a plurality of product categories based on the first product interest correlation score; and selecting the advertisement having a highest bid from the plurality of advertisers.

20. The non-transitory machine-readable storage medium of claim 19, wherein the plurality of advertisers' auction bids are for two or more of the plurality of product categories.

* * * * *